US006728546B1

(12) United States Patent
Peterson et al.

(10) Patent No.: US 6,728,546 B1
(45) Date of Patent: Apr. 27, 2004

(54) COMPUTER PERIPHERAL BASE STATION FOR A CORDLESS TELEPHONE

(75) Inventors: Joe W. Peterson, Austin, TX (US); Ken D. Alton, Austin, TX (US); David J. Borland, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/384,309

(22) Filed: Aug. 26, 1999

Related U.S. Application Data

(62) Division of application No. 09/282,294, filed on Mar. 31, 1999, now abandoned, which is a division of application No. 09/275,583, filed on Mar. 23, 1999, now abandoned.

(51) Int. Cl.[7] .................................................. H04Q 7/20
(52) U.S. Cl. ........................ 455/462; 455/557; 455/561
(58) Field of Search ................................ 455/414, 462, 455/463, 464, 66, 556, 557, 558, 561, 569, 573, 414.1, 556.1, 556.2; 375/222

(56) References Cited

U.S. PATENT DOCUMENTS

| | | | | |
|---|---|---|---|---|
| 5,657,371 A | * | 8/1997 | Suomi et al. | 455/557 |
| 5,943,625 A | * | 8/1999 | Yeom et al. | 455/557 |
| 6,006,088 A | * | 12/1999 | Couse | 455/414 |
| 6,035,214 A | * | 3/2000 | Henderson | 455/556 |
| 6,101,216 A | * | 8/2000 | Henderson et al. | 375/222 |
| 6,255,800 B1 | * | 7/2001 | Bork | 455/463 |
| 6,308,062 B1 | * | 10/2001 | Chien et al. | 455/556 |

OTHER PUBLICATIONS

The iPatch, www.infinet.com/–jectech/ipatch.htm, Jun. 11, 1999, 2 pages.
Phones of the Future, The Wall Street Journal, Nov. 16, 1998, 1 page.

* cited by examiner

Primary Examiner—Lester G. Kincaid
(74) Attorney, Agent, or Firm—Meyertons Hood Kivlin Kowert & Goetzel, P.C.; Jeffrey C. Hood

(57) ABSTRACT

A computer system that functions as a cordless telephone base unit is disclosed. The computer system includes a cordless telephone device that can be operative through the computer system. The cordless telephone device can function as a cordless telephone base unit with the help of an external antenna that can be attached to the computer system housing. The cordless telephone device may, for example, include a cordless telephone card installed in one of a plurality of connector slots on the computer system motherboard. The cordless telephone device is coupled to a sound device, which may be a computer sound card and may also be installed on the computer system motherboard. The cordless telephone device comprises a cordless telephone base unit, a microphone output and a speaker input to allow the cordless telephone device to be coupled to the sound device in the computer system. An external cordless telephone handset is coupled to this cordless telephone device to allow a user to carry out a telephone communication over an external telephone line, which is connected to the sound device. The connection of the telephone line to the sound device also facilitates a telephone communication using the Internet. Thus, the computer unit will itself function as a cordless telephone base station. This will eliminate the need to have an external cordless telephone base unit.

24 Claims, 12 Drawing Sheets

COMPUTER PERIPHERAL BASE STATION FOR A CORDLESS TELEPHONE

CONTINUATION DATA

This is a divisional of co-pending applications Ser. No. 09/275,583 titled "Electronic Book" filed Mar. 23, 1999 abandoned, whose inventors are Paul R. Teich, Joe W. Peterson and James F. Buller (5500-09600) and Ser. No. 09/282,294 abandoned, titled "Digital Photo Album" filed Mar. 31, 1999 whose inventors are James F. Buller, Paul R. Teich and Ken D. Alton (5500-09100).

BACKGROUND OF THE INVENTION

1. Field of the Invention

The present invention relates to multifunctional computer systems, and more particularly, to a computer system that executes functions of a cordless telephone base unit.

2. Description of the Related Art

Computer systems have traditionally comprised a system unit or housing which comprises a plurality of electrical components comprising the computer system. A computer system typically includes a motherboard, which is configured to hold the microprocessor and the system memory, and one or more buses used in the computer system. The motherboard typically comprises a plurality of slots to accommodate various peripheral device controller cards, such as a sound card, a graphics card, a communication port controller card, etc. Through the motherboard slots, these controller cards are typically coupled to a PCI (Peripheral Component Interconnect) bus to facilitate data communications with the microprocessor and the system memory.

More recently, computer systems are evolving toward an integration of functions. Some modem computer systems are capable of performing a variety of advanced communication and signal processing functions, such as voice recognition, interactive data transmission and reception, telephone call routing, telephone communication using the Internet, etc. Internet telephony using a personal computer typically involves a sound card installed on the computer motherboard. The Internet telephony software configures the sound card to function as a telephone handset through its microphone and speaker jacks. The sound card is connected to a telephone line and the user is provided a telephone handset that is connected to the sound card through its microphone and speaker jacks.

A telephone communication may be either in a full-duplex mode, as in the conventional circuit-switched (i.e., traditional) telephone communication, or in a half-duplex mode, as is typically the case with the Internet telephone communication. In the full-duplex operation, the talking and listening can take place at the same time during the telephone communication. In the half-duplex mode, only one function, either talking or listening, may be performed at a given instance to have an intelligible telephone conversation. As the Internet is a packet-switched network, there is a strong possibility of out-of-sequence or delayed arrivals of various data packets containing the audio information. Because of the complexities associated with full-duplex operation, majority of packet-switched communications using personal computer sound cards is not truly full-duplex.

During an Internet telephone conversation, the user may want to switch to his/her cordless telephone handset without interrupting the conversation. If the telephone handset is attached to the user's computer, this may not be convenient. Further, an external coupling device may be needed to connect the computer sound card with the cordless telephone base station because the base station is now not connected to the telephone line. In addition to this, the user may also want to initiate a regular telephone conversation using the traditional circuit-switched telephone networks and with his/her cordless telephone handset. In that case, the external coupling device may need to be configured to accept the RF signals from the cordless telephone base unit and utilize the telephone line connected to the computer sound card to establish the requisite point-to-point telephone connection. In the absence of such an arrangement, the user may need to first connect the cordless telephone base station with the telephone line before initiating the telephone conversation.

Therefore, it is desirable to have a cordless telephone device that can be operative through the computer system and that can function as a cordless telephone base unit with the help of an external antenna that can be attached to the computer unit or housing. It is further desirable to have this cordless telephone device carry out the Internet (packet-switched) telephony as well as the conventional point-to-point (circuit-switched) telephony. Thus, the computer unit will itself function as a cordless telephone base station. This will eliminate the need to have an external cordless telephone base unit or any other coupling devices. The computer system will thus integrate the cordless telephone base unit, and hence, there will be a reduction in device redundancy.

When two or more users operate a common telephone instrument, as in a typical household, it may be desirable to have a telephone instrument, such as a cordless telephone handset, identify the specific user that is using the instrument at a given instance. This is helpful when each user has his/her personal preference that is different from that of the other. For example, one user may want to have a louder telephone speaker volume setting than the other one. It is therefore more convenient if, in addition to identifying the user, the telephone instrument also recognizes individual user preferences and automatically implements those preferences when the corresponding user is operating the instrument. It is noted that the cordless telephone handset that identifies the user and implements the user-specific preferences may also have a computer system as its corresponding cordless telephone base unit.

It is desirable to configure a personal computer to utilize the cordless telephone device to wirelessly transmit and receive data including text and images. A portable digital photo album is desirable to view transmitted photographs or images on an LCD display, but in a manner similar to viewing actual printed photographs through a photo album. Similarly, a portable electronic book will store the transmitted text and allow the user to read each page of the text in a way similar to reading an actual paper version of the text. Hence, a user will have his/her own personal digital image album or an electronic book, and will be able to conveniently store the information he/she deems interesting. The digital image album and the electronic book will also offer flexibility in user movements by allowing portability in information storage and retrieval.

SUMMARY OF THE INVENTION

The computer system according to the present invention includes a cordless telephone device operative through the computer system. The cordless telephone device may, for example, include a cordless telephone card installed in one of a plurality of connector slots on the computer system motherboard. The cordless telephone device is coupled to a sound device, which may be a computer sound card and may also be installed on the computer system motherboard. An external cordless telephone handset is coupled to this cordless telephone device to allow a user to carry out a telephone communication over an external telephone line, which is connected to the sound device. The connection of the telephone line to the sound device also facilitates a telephone communication using the Internet.

The cordless telephone device includes an antenna jack to couple an external RF antenna thereto. This external RF antenna may be installed in an antenna port provided on the computer system housing or may be directly connected to the cordless telephone device through the antenna jack. The cordless telephone device further includes a cordless telephone base unit, a microphone output and a speaker input to allow the cordless telephone device to be coupled to the sound device in the computer system.

In one embodiment, the computer system housing includes a built-in cordless telephone base station. Here, the cordless telephone base station, and not the sound device, is connected to the external telephone line. The computer system here functions as a cordless telephone base station for the regular (circuit-switched) cordless telephone communications only.

The present invention also contemplates a cordless telephone handset that identifies the user operating the handset and automatically configures itself to implement one or more preferences specified by that user. The cordless telephone handset unit includes a speaker recognition unit to ascertain an identity of the handset operator. A programming unit is provided to allow a user to input one or more user-specific preferences. The speaker recognition unit identifies the user and sends a corresponding signal to the programming unit, which, in turn, sends another signal to an operation control unit. The operation control unit, in response, configures the handset unit to implement one or more of the user-specific preferences. A display, such as an LCD display, may be provided to facilitate programming and display of user-specific preferences.

The speaker recognition feature may also be implemented in a traditional, non-cordless telephone instrument. In one embodiment, a non-cordless telephone instrument is contemplated to include speaker recognition unit in its housing. This regular telephone instrument also includes the programming unit and the operation control unit to identify the user and implement that user-specific preferences. The speaker recognition units in the regular telephone as well as in the cordless telephone handset operate on a voice print comparison method. Each telephone—the regular one or the cordless telephone handset—initially stores a voice print of the user. During a subsequent telephone conversation, the speaker recognition unit periodically samples the telephone operator's voice to ascertain his/her identity. If the operator's voice print matches the user's voice print, then the programming unit notifies the operation control unit of that. Thus, more than one user may conveniently operate a common telephone instrument or a cordless telephone handset that is configured to automatically implement the user's individual preferences.

A digital image or photo album according to the present invention comprises a housing that includes, for example, an LCD display provided on a face of said housing. The LCD display may be electronically partitioned into two LCD pages to create an impression of a pair of pages of a photo album. The housing also includes an input port to receive a storage medium, such as a compact disc (CD) or a floppy disk. Each of these storage media store one or more photographs in a digital format. The digital photo album includes a command input unit that allows a user to input a number of predetermined commands to select and view the photographs or images. The photographs or images to be displayed on the LCD display are first converted from said digital format into a user viewable format. A file viewer unit in the digital image album performs this conversion, whereas a display control unit ultimately displays the photographs or images, one pair at a time, through the LCD display.

A number of keys may be provided in the housing to allow the user to input one or more of the predetermined commands. Alternately, a touch-screen LCD display may be provided in the housing to achieve the same purpose. A transmit port, a receive port or both may be provided in the housing to allow the digital photo album to perform data communication wirelessly. The earlier mentioned computer system with a cordless telephone device may accomplish such a data transfer using the functionality of the built-in cordless telephone base unit.

In another embodiment, the digital photo album comprises two housings mechanically hinged and electrically coupled with each other. Each housing includes one LCD display to display one photograph. Thus, jointly, the two housings display two photographs creating an impression of the actual paper pages of a photo album. The various electronic circuitry is conveniently distributed between the two housings. One, or both, of the housings may include the input port to receive the storage medium as explained earlier. The user operable keys, if provided, may be distributed between the two housings according to the designer's choice. Instead, a pair of touch-screen LCD displays may be provided—one on each housing.

The electronic book according to the present invention may either include a single housing or a pair of mechanically hinged housings as earlier described with reference to the digital image album. The electronic book allows a user to view a pair of pages at a time through its display, which may be an LCD display. The LCD display may either be a single continuous display or a single display electronically divided into pages in case of a single housing, or may comprise a pair of displays in case of the pair of mechanically hinged housings. The user can read two pages at a time—as in a paper version of a book. The pages may contain text as well as images. The text is stored in one digital format? and the images are stored in a different digital format to allow for compatibility with present compression schemes.

In one embodiment of the electronic book, an RF port is provided to facilitate a wireless data communication with an external electronic device. The external electronic device may include the earlier described computer system with built-in cordless telephone base unit. In that case, the cordless telephone base unit in the computer system will accomplish the necessary RF communication with the electronic book. Similar to the digital photo album, the electronic book may also have a number of keys provided in the single housing, or distributed over a pair of housings, to allow the user to input one or more of the predetermined commands. The predetermined commands may perform operations such as selection of a text, repagination, deletion of a selected text, etc. Alternately, a touch-screen LCD display may be provided in the housing to perform the same operations. An individualized storage and retrieval of text, images and photographs is thus achieved.

BRIEF DESCRIPTION OF THE DRAWINGS

Other objects and advantages of the invention will become apparent upon reading the following detailed description and upon reference to the accompanying drawings in which.

DETAILED DESCRIPTION OF THE INVENTION

Figure 1A:
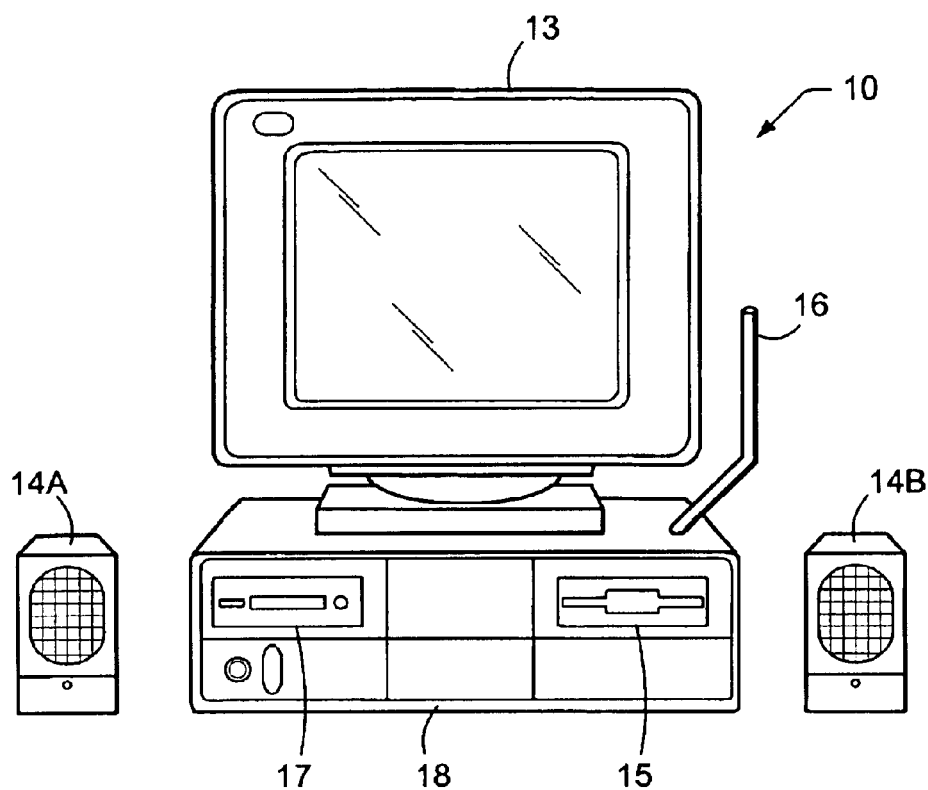
FIG. 1A shows a computer system with a built-in cordless telephone base unit with an RF antenna attachable to the computer system housing.
Figure 1B:
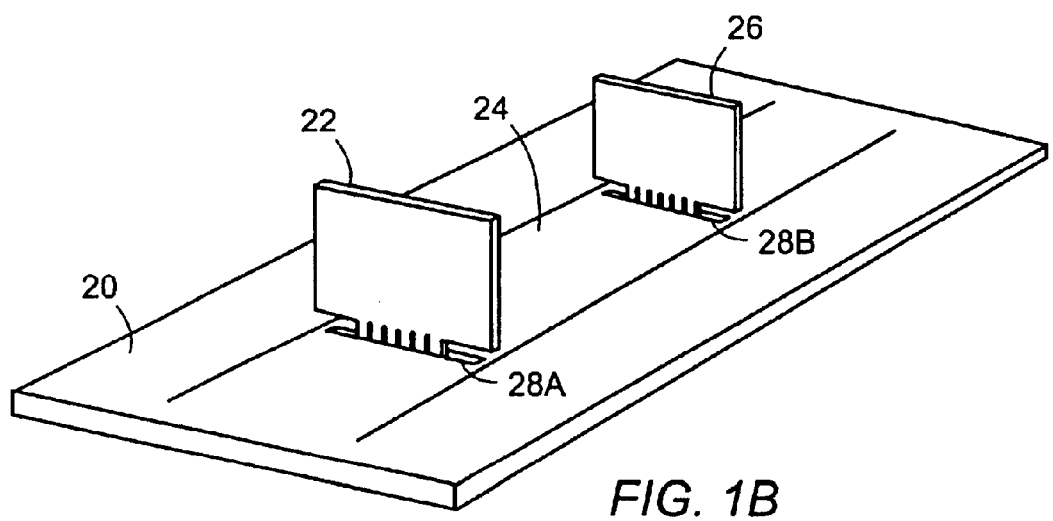
FIG. 1B shows a computer system motherboard with slots to receive a cordless telephone card of the present invention and a sound card, thereby coupling these two cards through a PCI bus.

Referring now to FIG. 1A, a computer system 10 with a built-in cordless telephone base unit is shown. The computer system 10 includes a housing 18 and a visual display unit or monitor 13. The housing 18 contains a number of I/O ports, such as the compact disc (CD) drive port 17 and the floppy disk drive port 15. The housing 18 further includes a non-volatile memory, such as a hard disk drive (not shown), and a motherboard 20 (FIG. 1B). FIG. 1B shows a simplified view of the computer system motherboard 20 having two connector slots, 28A and 28B. The connector slots 28A and 28B are coupled to an expansion bus 24, preferably a PCI bus. A cordless telephone device or card 22 is installed into the connector slot 28A, whereas a sound card or device 26 is installed into the connector slot 28B. A number of external speakers, 14A and 14B (FIG. 1A), may be coupled to the sound card 26 to convert an audio signal into an audible sound. FIG. 1A shows an RF antenna 16 connected to an antenna port (not shown) in the housing 18. The RF antenna 16 is electrically coupled to an antenna jack 35 (FIG. 3) provided in the cordless telephone card 22.

The computer system 10 expansion bus 24 may include a FireWire bus, a Universal Serial Bus (USB), a FC-AL (Fibre Channel-Arbitrated Loop) bus, an ISA or EISA bus, an MCA (Micro Channel Architecture) bus or any other system bus on or off the motherboard 20. Further, if the computer system 10 does not include a motherboard 20, then the cordless telephone device 22 and/or the sound device 26 may be adapted to be attached to the computer system housing 18. The following discussion relates to a computer system 10 where the housing 18 includes a motherboard 20 and the cordless telephone device 22 is a card that is installed into one of the connector slots 28A on the motherboard 20. The sound device 26 is shown as a computer system sound card 26 that is also installed into one of the connector slots 28B on the motherboard 20. Further, as way of example only, the expansion bus 24 is shown to be the PCI bus. It is understood that the discussion given below may equally apply to other expansion bus architectures, and other computer system configurations with or without a motherboard. Further, the cordless telephone device 22 and the sound device 26 may take forms other than the system card configuration shown and explained herein.

Figure 2:
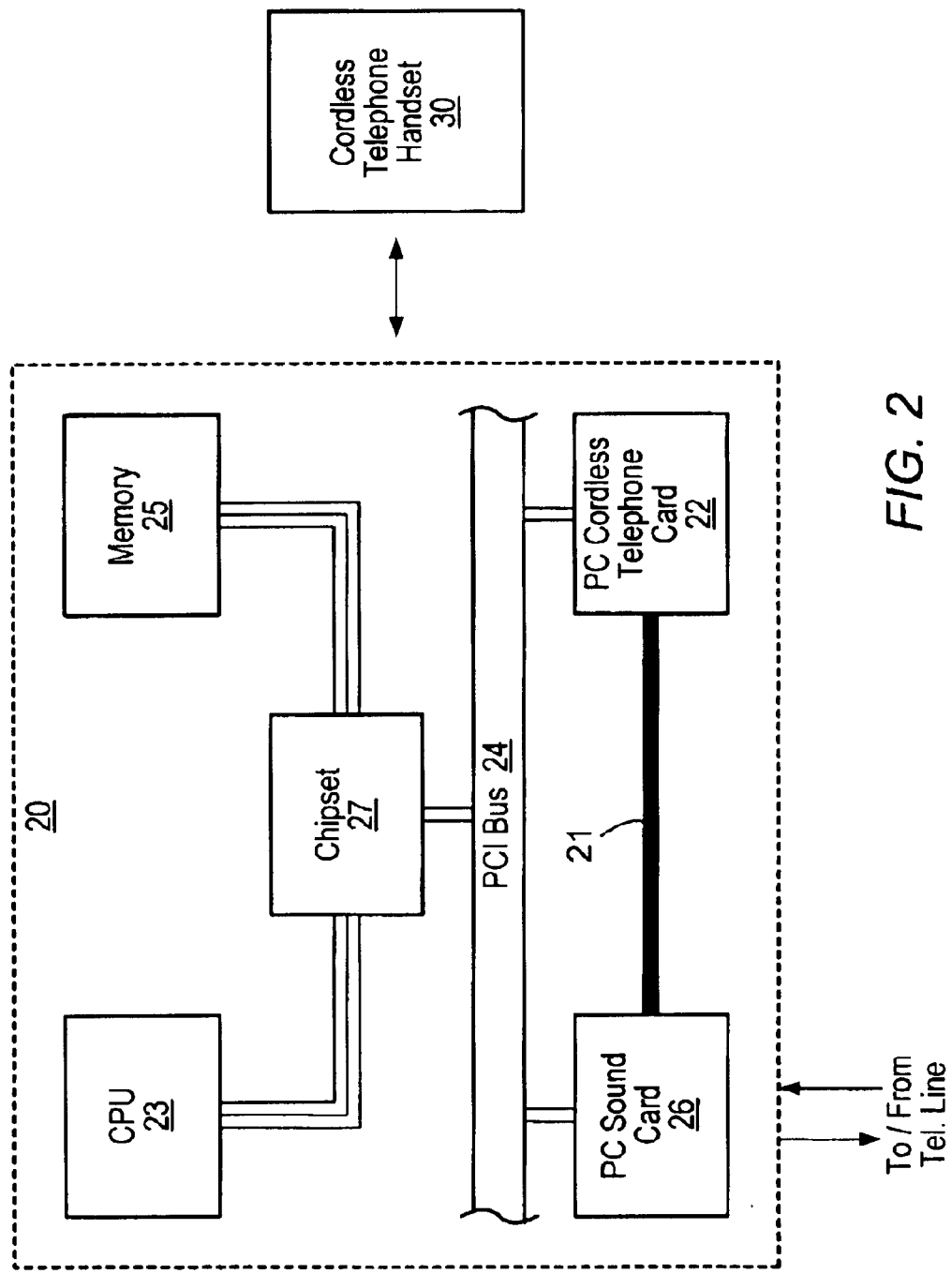
FIG. 2 schematically depicts the computer system housing containing the cordless telephone card coupled to other circuit elements in the computer system.

A schematic detail of various computer system components comprising the mother board 20 is shown in FIG. 2. The cordless telephone card 22 is shown coupled to the sound card 26 through the PCI bus 24 as well as through a direct coupling 21. The central processing unit (CPU) 23 and the system memory 25 in the computer system 10 are shown coupled to the PCI bus through a chipset device 27. The system memory may be a static RAM, a dynamic RAM, an SDRAM, or any other memory as is known in the art. An internal battery may be supplied to maintain a non-volatile storage in the system memory. The chipset device 27 may include one or more special function integrated circuits, such as an interrupt controller or a memory controller (not shown), to allow coupling of one or more I/O cards to CPU 23 and system memory 25. FIG. 2 also shows an external cordless telephone handset 30 as having a wireless communication link with the computer system 10 through the help of the cordless telephone card 22 installed on the motherboard 20.

Figure 3:
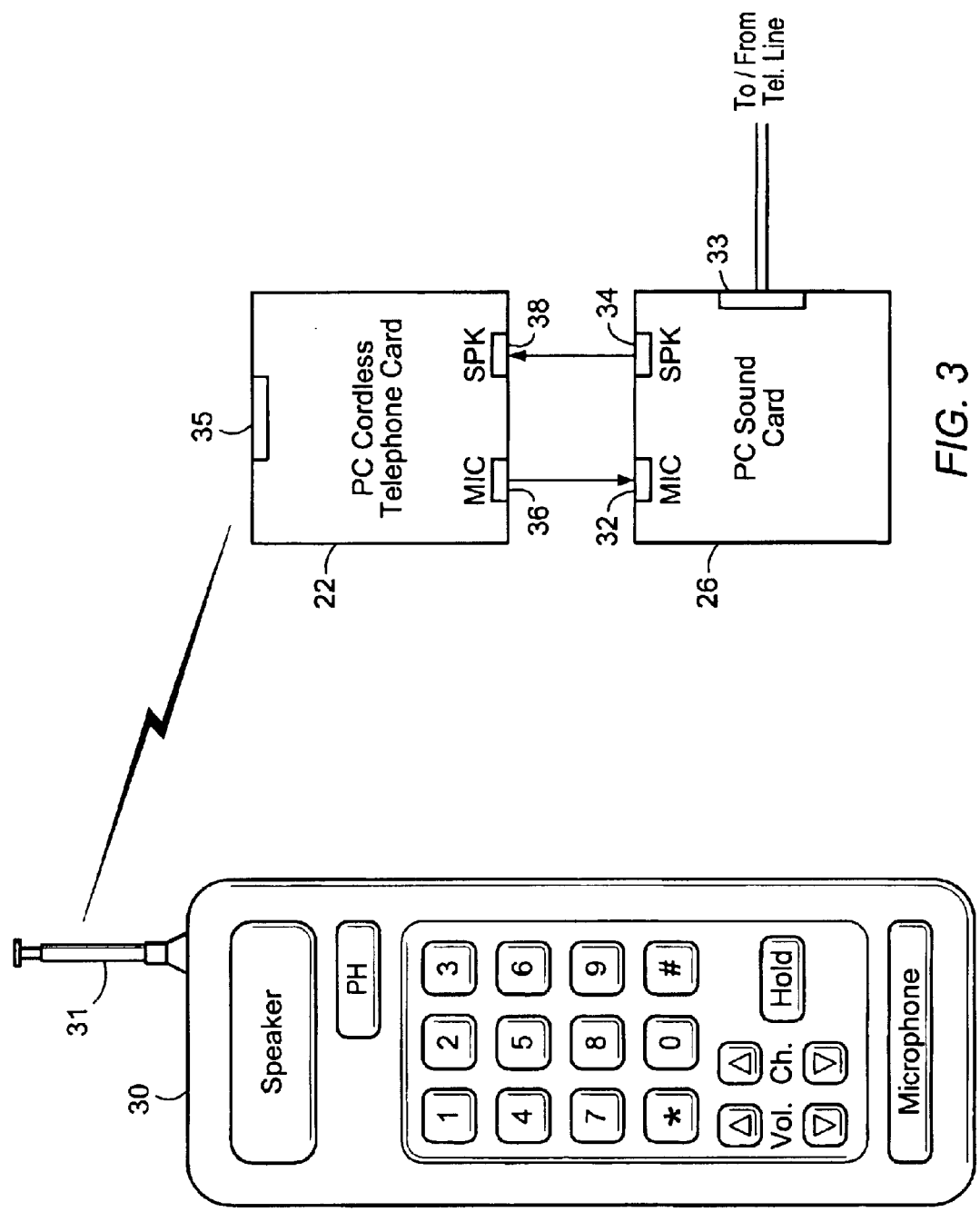
FIG. 3 shows the physical connection between the cordless telephone card and the sound card in the computer system. An external cordless telephone handset is shown to provide the necessary functional perspective.

FIG. 3 shows in greater detail the communication arrangement involving the external cordless telephone handset unit 30, the cordless telephone card 22 and the sound card 26. As shown in FIG. 3, an RF signal transmitted by the handset unit antenna 31 is received by the RF antenna 16 (not shown in FIG. 3) mounted on the housing 18 of the computer system 10. The RF antenna 16 is coupled to the antenna jack 35 provided on the cordless telephone card 22. The microphone output 36 of the cordless telephone card 22 is coupled to the microphone jack 32 of the sound card 26; and the speaker input of the cordless telephone card 22 is coupled to the speaker jack on the PC sound card 26. As described later, the cordless telephone card is configured to convert the transmitted RF signal to a transmit audio signal which is similar to an analog electrical signal generated by a microphone when a user speaks into it. This transmit audio signal is then received by the microphone jack 32 in the sound card 26 and transmitted through an external telephone line (not shown) as a telephone signal. The external telephone line is connected to the sound card 26 through a telephone line jack 33 that may be provided on the sound card 26. In the preferred embodiment, the sound card includes a data communication device or card, such as a fax/modem card, to send and receive audio carrying data packets over the external telephone line. In one embodiment, the sound card 26 may be coupled to a separate data communication card (not shown), also installed in one of the connector slots in the motherboard 20 through the PCI bus 24. The communication card, in turn, may be directly connected to the external telephone line. Through the PCI bus 24, the sound card 26 then sends audio signals, converted into data packets, to the communication card for transmission over the telephone line. The sound card 26 in FIG. 3, however, includes such a communication card with built-in telephone jack 33, as shown.

In the embodiment of FIG. 3, when the telephone line receives a telephone signal, the sound card converts that telephone signal into a receive audio signal that can produce an audible sound if fed to the external speakers, 14A and 14B in FIG. 1A. The user may deactivate the external speakers 14A, 14B when a telephone communication mode is selected. Hence, the receive audio signal is sent to the speaker input 38 of the cordless telephone card 22. As described later, the cordless telephone card 22 converts this receive audio signal into an RF signal to be transmitted to the external handset unit 30 through the RF antenna 16 coupled to the cordless telephone card antenna jack 35. In this manner, a complete wireless communication using the computer system 10 and an external cordless telephone handset 30 can be carried out without the need for an external cordless telephone base station (not shown).

The sound card 26 may be used to carry out a telephone communication using the Internet. As mentioned before, due to the inherent delays in the packet-switched Internet communication and due to the complexities involved in configuring a sound card to facilitate the Internet telephony in the full-duplex mode; it is convenient to carry out Internet telephone communication using the sound card in the half-duplex mode. The computer system 10 is programmed to allow a telephone communication using the Internet through the sound card 26.

Figure 4:
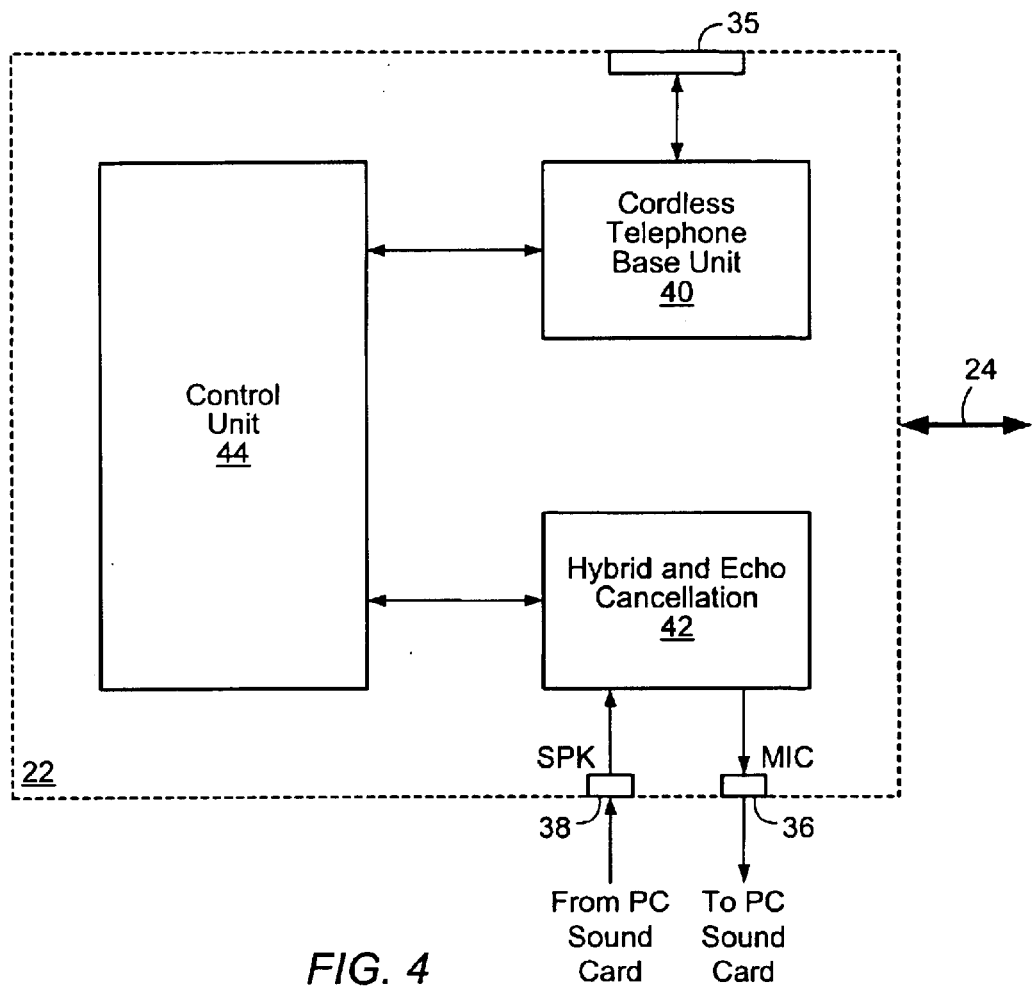
FIG. 4 is a detailed block diagram of the circuit elements contained in the cordless telephone card according to the present invention.

Referring now to FIG. 4, an internal block diagram of the cordless telephone card 22 is shown. The antenna jack 35 is coupled to a cordless telephone base unit 40. The cordless telephone base unit 40 functions substantially similarly to a regular cordless telephone base station. During a cordless telephone communication using the Internet, the cordless telephone base unit 40 receives the RF signal transmitted by the external cordless telephone handset 30 and converts that RF signal into the transmit audio signal to be fed to the microphone jack 32 of the sound card 26, and similarly, the cordless telephone base unit 40 receives the receive audio signal from the speakerjack 34 of the sound card 26 and converts it into an RF signal to be transmitted to the cordless telephone handset 30 through the RF antenna 16. Hence, an external cordless telephone handset can communicate with the computer system 10 with the help of this built-in cordless telephone base unit 40.

It is noted that a half-duplex communication using the Internet is preferably carried out by the sound card 26 and an appropriate communication software installed in the computer system 10. Thus, a user may input a telephone number and the mode of communication, i.e. the packet-switched communication using the Internet, through the visual display unit (VDU) 13 using an external data input device, such as a keyboard (not shown). A control unit 44 provided on the cordless telephone card 22 monitors the PCI bus 24 to identify the user selection and instruct the sound card to establish the communication through the Internet. The control unit 44 couples the cordless telephone card 22 with other computer system components through the PCI bus 24. The sound card 26, as configured under the installed communication software, transmits and receives the necessary data packets using the external telephone line and the Internet. Any received data packets containing voice data are then processed by the sound card and the communication software to generate appropriate audio signals therefrom. The control unit 44 communicates to the sound card 26 using the PCI bus 24 to monitor the status of received data packets. Any generated audio signal is then immediately fed to the cordless telephone base unit to convert it into an RF signal to be transmitted to the external cordless telephone handset unit 30. In a similar manner, the control unit 44 monitors any signals received by the cordless telephone base unit 40 from the RF antenna 16. The cordless telephone base unit 40 converts any received RF signal into a transmit audio signal as described earlier. The control unit 44 then facilitates a transmission of this transmit audio signal to the sound card through the microphone output 36 of the cordless telephone card 22. The sound card, in turn, converts this transmit audio signal into one or more data packets to be transmitted over the Internet. This way, a cordless telephone communication using the VDU 13 to input the necessary telephone number may also be carried out over the Internet.

Instead of the half-duplex communication using the Internet, the user may select a regular telephone communication (full-duplex) using the circuit-switched telephone network. The user, in that case, may input a telephone number and an appropriate communication mode, i.e. the circuit-switched communication mode here, through the VDU 13, again using an external data input device, e.g. a keyboard. The control unit 44, in this situation also, monitors the PCI bus to identify the user selection. In response to the user's request for a circuit-switched telephone communication, the control unit 44 instructs the cordless telephone base unit 40 to carry out the desired communication in a cordless fashion. The communication software identifies this user request and disables the sound card telephone features. Thus, when the user opts for a regular telephone communication, the control unit 40 together with the operating communication software instruct the sound card to function as a mere passive connecting link. Therefore, a signal from the cordless telephone base unit 40 appears directly at the telephone jack 33 on the sound card 26 without being processed by the sound card. This facilitates a full-duplex communication using the external handset 30.

In a full-duplex telephone communication, the cordless telephone base unit 40 functions exactly as a normal cordless telephone base station (not shown). That is, the cordless telephone base unit 40 converts any received RF signals first into the transmit audio signal and then into a telephone signal to be transmitted over the external telephone line. Similarly, any received telephone signal is first converted into a receive audio signal and then into an RF signal to be transmitted to the external cordless telephone handset 30. In this manner, the cordless telephone base unit 40 effectively bypasses the digitization of audio signals and then transmission and reception of audio data packets through the sound card 26. In the circuit-switched mode, the cordless telephone card 22 functions almost independently of the sound card 26. The sound card 26 merely provides a passive connection to the telephone jack 33.

When a two-way packet-switched communication with a single RF link connecting the computer system 10 and the external cordless telephone handset 30 is accomplished using the sound card 26, care has to be taken not to mix the receive audio with the transmit audio. This is necessary to prevent unstable oscillations in the sound card circuitry. Because, in the case of a computer sound card, sending the audio coming from the speakerjack 34 back down the line to the microphone jack 32 would set up a highly oscillatory circuit in the sound card 26. One way to accomplish this is through the use of a hybrid 42. The hybrid 42 is designed to allow mixing of transmit audio and receive audio over the single RF channel linking the sound card, the cordless telephone base unit and the external cordless telephone handset. Especially during the Internet communication, the hybrid 42 is useful to keep transmitted and received audio over the RF link from being mixed in the sound card and thereby destabilizing the sound card audio circuitry. The control unit 44 is configured to route the transmit and receive audio signals through the hybrid 42. Thus, the hybrid 42 functions as an interface between the cordless telephone base unit 40 and the sound card 26, especially during the Internet communication. As the sound card audio functions are deactivated when the user selects a regular telephone communication, the control unit also deactivates the hybrid unit 42 and, hence, the hybrid 42, in this situation, functions merely as a passive conducting wire to carry the audio signals to the sound card telephone jack 33. The hybrid 42.may also include an echo cancellation circuit to removes unwanted echoes from the signal on a telephone line. Echoes are usually caused by impedance mismatches along an analog telephone line.

In one embodiment, the computer system 10 is configured to allow the user to store one or more telephone numbers in the system memory 25 with the help of the external input device (not shown) and the VDU 13. The user may wish to use the Internet communication mode for some of these telephone numbers, and the regular circuitswitched telephone communication for others. Thus, upon a mode selection by the user, i.e. the Internet communication mode or the regular telephone communication mode, the sound card 26 and the cordless telephone card 22 may be configured to retrieve the respective telephone numbers from the system memory 25 through the PCI bus 24. The communication software installed in the computer system 10 may send one or more telephone numbers from the system memory 25 during an Internet communication request by the user. On the other hand, the control unit 44 may communicate with the system memory 25 and transfer one or more telephone numbers retrieved therefrom to the cordless telephone base unit 40 when the user requests the regular, circuit-switched telephone communication.

The computer system housing 18 preferably includes a motherboard 20, a hard disk drive or a suitable non-volatile memory (not shown) coupled to the motherboard 20, and one or more I/O ports coupled to the motherboard 20 to connect one or more I/O devices to the computer system 10. The housing 18 may further include an antenna port (not shown) to receive an external RF antenna 16 therein as shown in FIG. 1A. A regular cordless telephone base unit (not shown) may be included in the housing to facilitate cordless telephone communication with the external cordless telephone handset 30. This base unit is coupled to the antenna port to transmit and receive RF signals therefrom. The housing 18 may also include a telephone line jack (not shown) to transmit and receive telephone signals through an external telephone line (not shown). The cordless telephone base unit is, then, coupled to the telephone line jack. Thus, with only the external handset 30, a user may commence and receive a telephone communication. This embodiment, however, does not contemplate a cordless telephone card, as previously described. Hence, the user may not be able to carry out a cordless telephone communication using the Internet because the cordless telephone base unit in this embodiment is not connected to any other computer system components. The housing 18, additionally, may include an I/O port (not shown) to receive the cordless telephone base unit, which may be made detachable from the housing 18. This arrangement is conceptually similar to a detachable car stereo. This effectively utilizes space inside the computer system housing 18, and reduces device redundancy.

The computer system 10 may also be configured to transmit and receive digital data cordlessly using the cordless telephone base unit 40 of the cordless telephone card 22. The digital data, in the form of a number of data packets or in the form of a data stream, may be received by the control unit 44 over the PCI bus 24. In the data communication mode, the control unit 44 receives and transfers the digital data to the cordless telephone base unit 40 to be converted into appropriate RF signals for transmission. When the cordless telephone base unit 40 receives RF signals containing digital data, it transfers these signals to the control unit, which, in turn, demodulates the received RF signals to recover therefrom the sent digital information, either in the form of a number of data packets or in the form of a data stream. The recovered digital data may then be sent to the appropriate receiver in the computer system 10 through the PCI bus 24. The digital data may include text files and image files, which, in turn, may include a number of photographs in a digital format.

Figure 5:
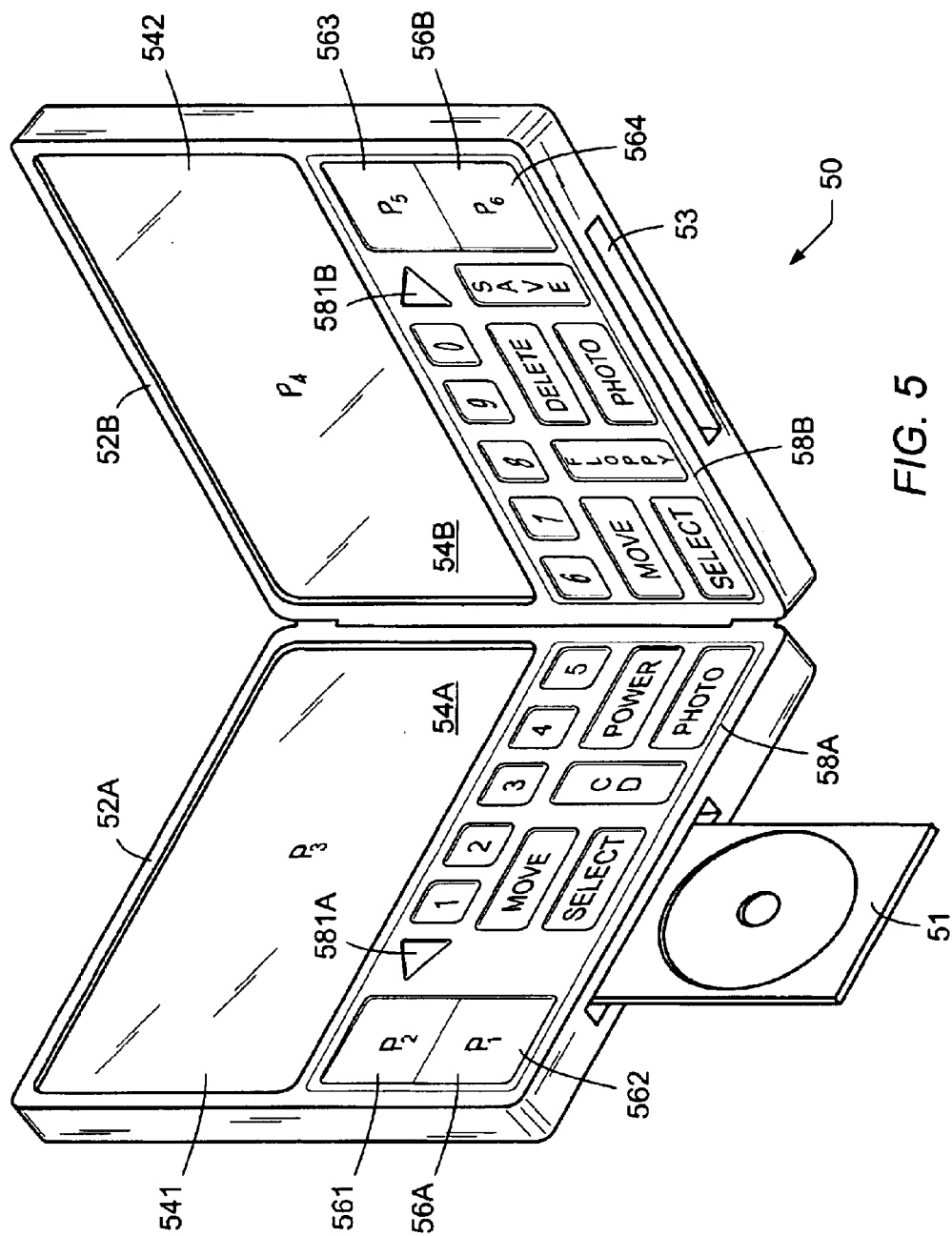
FIG. 5 shows a physical layout for a digital image/photo album or an electronic book.

Referring now to FIG. 5, a physical layout for a digital photo/image album 50 is shown. The discussion herein mentions storage, retrieval and display of photographs in a digital format, but it is noted that the invention equally applies to any image in a digital format and is not confined merely to digital photographs. Due to a number of constructional similarities, the discussion pertaining to this digital image album 50 may also be applied to an electronic book according to the present invention. Further, as discussed with reference to FIGS. 9 and 10, this digital image album 50 may be configured to wirelessly communicate with the computer system 10.

The digital photo album 50 comprises two housings, 52A and 52B. Both of these housings are mechanically hinged with each other. However, both of these housings are electrically coupled with each other to provide necessary electrical connections between the circuits contained in one housing and those contained in the other housing. The first housing 52A includes a display 54A on one of its faces. This display 54A may be an LCD display or a TFT active matrix display or any other suitable display that does not destroy the portability of the digital image album 50. Here, for discussion only, the display 54A is selected to be an LCD display. This LCD display 54A displays one photograph. Similarly, the second housing 54B also includes a display 54B, and that display can also be an LCD display or a TFT active matrix display or any other suitable display. Again, for discussion only, the display 54B is selected to be an LCD display. This LCD display 54B also displays a second, different photograph. These LCD displays 54, together, create an impression of a regular photo album.

The first housing 52A may include an input port 51 to receive a storage medium (not shown) such as a compact disc (CD), a floppy disk or a digital video disk (DVD). The second housing 52B may also include another input port 53 to receive a second storage medium. In the alternative, as described later, the digital photo album 50 may receive digitized photographs through a cordless communication with an external transmitting device, such as the computer system 10 of FIG. 1A. One storage medium may store a number of photographs in one digital format, whereas the other storage medium may store a second set of photographs in a second digital format. The digital format may be a native file format requiring a manufacturer-specific software for reading the coded file, or it may be a transfer file format generally accepted in the industry. Some popular transfer file formats include the following file extensions: TIFF (Tag Image File Format), GIF (Graphics Interchange Format), JPG for a JPEG file (Joint Photographic Experts Group) and BMP (Windows Bitmap Format). One or more of these files may be stored using a compression scheme. A JPEG file may employ a lossy compression scheme, a BMP file may employ a lossless RLE (Run Length Encoding) compression, whereas the GIF and TIFF files may employ another lossless compression mechanism, such as the LZW (Lempel-Ziv-Welsh).

Each housing, 52A and 52B, in the digital photo album 50 includes one section, 58A and 58B respectively. These sections together form a command input unit. The command input unit includes a number of keys embedded on respective faces of the housings 52A, 52B, whereby a user inputs a command to manipulate the photographs stored in the storage medium. A number of predetermined commands are associated with some of these keys that are selected individually. The remaining keys may be selected in combination with these individual command keys to execute other predetermined commands. For example, the arrow keys, 581A and 581B, in the command input unit may "flip" a pair of photographs at a time. Thus, when the key 581A is depressed, two photographs that are stored immediately prior to the photograph $P_3$ 541 on the storage medium or in the system memory 66 (FIG. 6) may be displayed in place of photographs $P_3$ 541 and $P_4$ 542 respectively. On the other hand, the arrow key 581B may display two photographs that are stored on the storage medium or in the system memory 66 (FIG. 6) in immediate succession to the photograph $P_4$, replacing the current photographs $P_3$ and $P_4$ respectively. The details regarding other keys are given later in the discussion. The digital photo album 50 displays these photographs on the LCD displays, 54A and 54B, in a user viewable format. This may require a conversion of the photographs from the digital format to the user viewable format. Thus, the digital data containing photographic images are converted into video signals so that the user may view the underlying photographs through the LCD displays 54.

Figure 6:
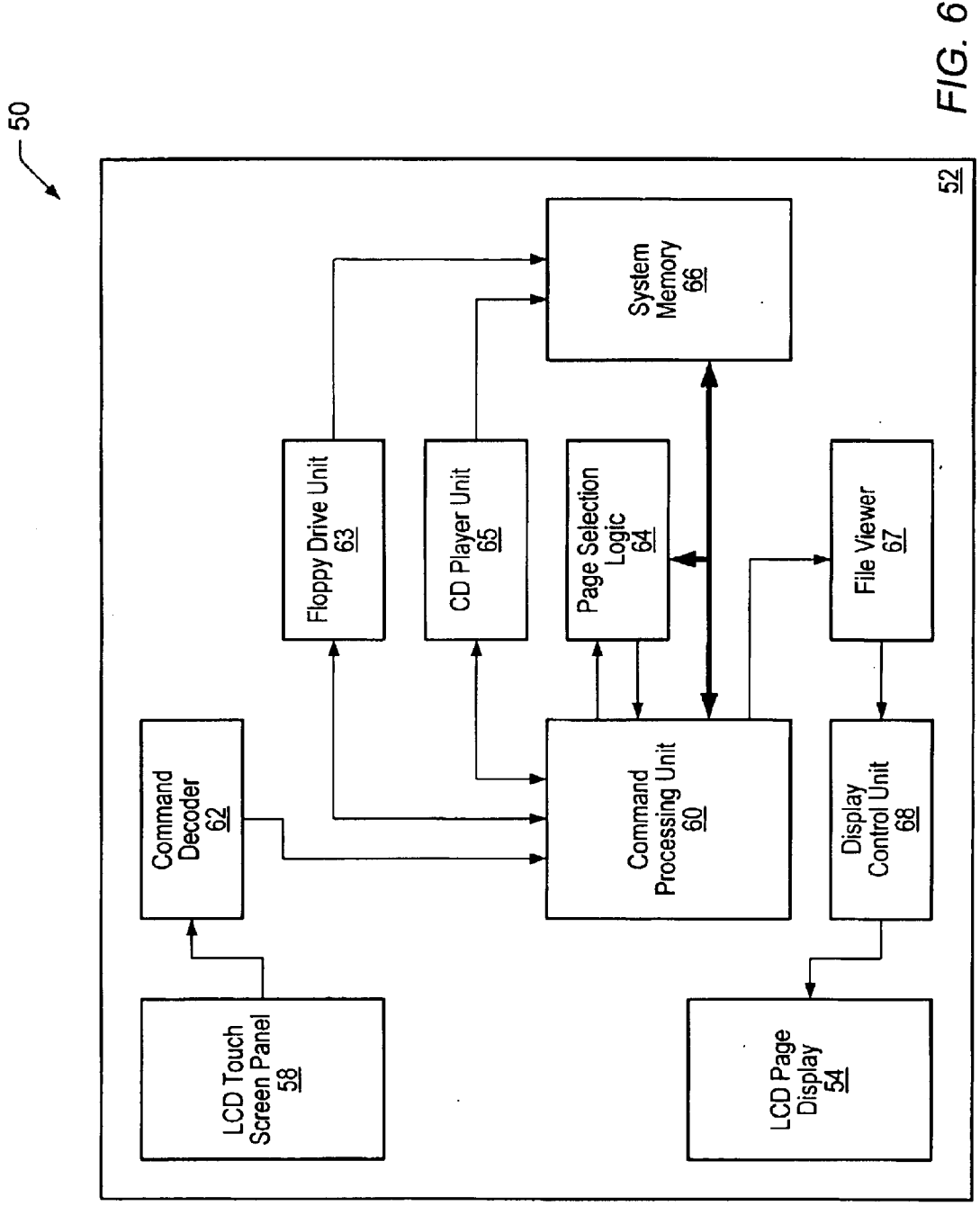
FIG. 6 is a block diagram depiction of the functional blocks contained in the physical layout of FIG. 5.

The digital photo album 50 may further include two more displays, 56A and 56B. These displays, again, may be LCD displays or TFT active matrix displays or any other suitable displays that allow portability of the digital photo album 50. For discussion purpose, these displays are treated as LCD displays. The first one of these LCD displays, 56A, may be provided in the left most corner of the first housing 52A as shown in FIG. 5. The second one of these LCD displays, 56B, may be placed in the right most corner of the second housing 52B, as also shown in FIG. 5. It is to be noted that the main LCD display screens, 54A and 54B, may be of the size equal to a regular photograph print. For example, each of these primary LCD displays, 54A and 54B, may be of dimension 3"×5" or 5"×7" or of any other suitable dimension. On the other hand, the secondary LCD displays, i.e. displays 56A and 56B, are far smaller in size. They are provided for the user to have a reference of the sequence in which the photographs are stored, and hence, displayed. The LCD display 56A displays a pair of photographs $P_2$ and $P_1$, 561 and 562 respectively, that is stored immediately prior to the photograph $P_3$ on the storage medium or in the system memory 66 (FIG. 6). Whereas, the LCD display 56B displays a pair of photographs $P_5$ and $P_6$, 563 and 564 respectively, that is stored in immediate succession to the photograph $P_4$ on the storage medium or in the system memory 66 (FIG. 6). Thus, the size of the LCD displays 56A and 56B will vary depending on the design considerations and available display resolutions. Further, the two secondary LCD displays, 56A and 56B, may instead display just one photograph each. Thus, the LCD display 56A may display a photograph that is stored at a memory location or on the storage medium immediately prior to the photograph 541. Similarly, the LCD display 56B may display a single photograph, instead of a pair as in FIG. 5, that is immediately "behind" the displayed photograph 542. This provides the user with a reference as to how the photo album would look like.

Referring now to FIG. 6, a block diagram of the functional blocks contained in the physical layout of FIG. 5 is shown. As previously noted, the physical layout in FIG. 5 may also represent an electronic book according to the present invention. More details regarding the electronic book are given later in this discussion. But, it is understood that the block diagram of FIG. 6, thus, may be used to explain various functions performed either by the digital photo album or the electronic book. The digital photo album 50 in FIG. 6 includes two input ports 51, 53 to receive similar or different types of storage media. It is preferable to have at least one input port to allow the user to view the photographs in a commercially available storage medium. Further, one storage medium may store one set of photographs in one digital format and the other storage medium may store a second set of photographs in a different digital format. In the exemplary embodiment of FIG. 6, the input port 51 receives and runs a compact disc (CD) through the CD player unit 65, whereas the input port 53 receives a floppy disk that is operated by the floppy drive unit 63. As mentioned earlier, other types of storage media, for example, a digital video disk (DVD), and their corresponding driver units may also be provided.

Each input port, 51 and 53, is coupled to a system memory 66 to allow the system memory 66 to store the digitized photographs received from the floppy drive unit 63 and the CD player unit 65. The system memory 66 may include a static RAM, a dynamic RAM, an SDRAM (Synchronous DRAM), a Rambus® DRAM or any other memory device depending on the cost and design considerations. The digital image/photo album 50 may contain an on-board battery to allow for non-volatile storage. The operation of each input port is controlled by a command processing unit 60. Thus, the command processing unit 60 may instruct the system memory 66 to receive the contents of a compact disc containing digitized photographs, and may simultaneously instruct the CD player unit 65 connected to the input port 51 to transfer the contents of the CD loaded therein to the system memory 66. This achieves portability, storage and manipulation of photographs once they are stored in the system memory. FIG. 6 depicts the housing 52, which signifies the interconnected nature of various circuit blocks spread out over two physical structures—the first housing 52A and the second housing 52B. The LCD page display block 54 represents all the display screens provided on the two housings, i.e. the displays 54A, 54B, 56A and 56B. The housing 52 also includes a file viewer 67 to convert each photograph stored in a digital format into a user viewable format. Commercial file viewer programs support a number of digital formats or file extensions. Once converted, the photograph is then sent to the display control unit 68 for display on the appropriate LCD display. The command processing unit 60 supplies the file viewer 67 with the photograph in the digital format and instructs the file viewer 67 regarding the location of display of the photograph.

It was mentioned earlier that the command input unit sections 58A and 58B comprise a number of embedded keys, one or more of which may be selected by the user to execute one or more of a number of predetermined commands. In the embodiment of FIG. 6, the functionality of keys is implemented through a pair of touch screens. These touch screens have similar outward appearance and perform similar function as the input sections and hence, the touch screens may be designated by the same numerals, 58A and 58B, as the input sections in FIG. 5. These touch screens are collectively referred to as the LCD touch-screen panel 58 in FIG. 6. Thus, the input keys would now be displayed as designated areas on the touch-screen panel 58. To input a command, the user may touch one or more designated areas instead of depressing the embedded keys. The designated areas may include one or more symbols with corresponding texts. For example, the rectangular POWER key may be represented by a symbol for electrical power and the letters POWER below that symbol. Additionally, the designated areas may include one or more decimal digits as shown in FIG. 5. One or more icons, such as the arrow pointers 581A and 5811B or a circle (not shown) to represent the CD key, may also be included as part of the designated areas on the LCD touch screen panel 58 as is known in the art.

The functions of some of the "keys" on the touch-screen panel 58 are described herein as examples only. The designer may select or modify the functions or the sequence of "key" selections. As previously described, the user may touch the arrows 581A, 5811B to "flip" the digital photo album "page" with a new pair of photographs. The CD "key", when touched, will instruct the input port 51 to start the CD player function through the CD player unit 65. In response, the first two photographs stored on the CD will be displayed as photographs 541 and 542 respectively, the secondary LCD display 56A will remain blank, and the other secondary LCD display 56B will show a smaller version of the subsequent pair of photographs on the CD. The SAVE "key" on the touch-screen panel 58B saves the full content of the CD in the system memory 66. If, instead, the FLOPPY "key" is touched and if a floppy containing digitized photographs is inserted in the input port 53, then photographs from the floppy will appear on the LCD display 54 in the sequence earlier described. This time, if the SAVE function is selected, then the digital content of the floppy will be stored in the system memory 66. The designated areas, on the touch-screens 58A and 58B, denoted by the letters SELECT function to select one of the displayed photographs in a clockwise sequence. Thus, the first touching of the SELECT text on the touch-screen section 58A will "highlight" the photograph 562, the second touch will "highlight" the photograph 561 and the third touch will "highlight" the photograph 541 with only one photograph being highlighted at a given time. Similarly, the SELECT "key" on the touch-screen section 58B will "select" the photographs 542, 563 and 564 in that order. The terms "highlight" and "select" are borrowed from the typical text highlighting or text selection functions used in a word processing application.

The selected or highlighted photograph may then be moved to a different "page" in the album. This is done with the help of the MOVE function. Thus, for example, if the user wants to swap the first photograph in the digital album, i.e. photograph $P_1$, with the fourth photograph, $P_4$, then the following sequence of steps may be performed: (1) First, keep "pressing" the SELECT "key" until the first desired photograph, here photograph $P_1$, is selected; (2) Touch the MOVE function "key"; (3) Now select the second of the desired photograph, here $P_4$, using the appropriate SELECT "key"; and (4) "Press" the MOVE "key" again from the touch-screen panel displaying the second photograph, here the touch-screen LCD display 58B. This sequence of operations will swap the photographs $P_4$ and $P_1$ on the display. It will also swap the storage locations for the two photographs in the system memory 66. Thus, the old photograph $P_1$ will now be numbered, albeit internally, and displayed as photograph $P_4$. The user may also move a selected photograph to an empty location on the LCD display 54 or may further alter the sequence of photographs with the help of the PHOTO "key".

Figure 7:
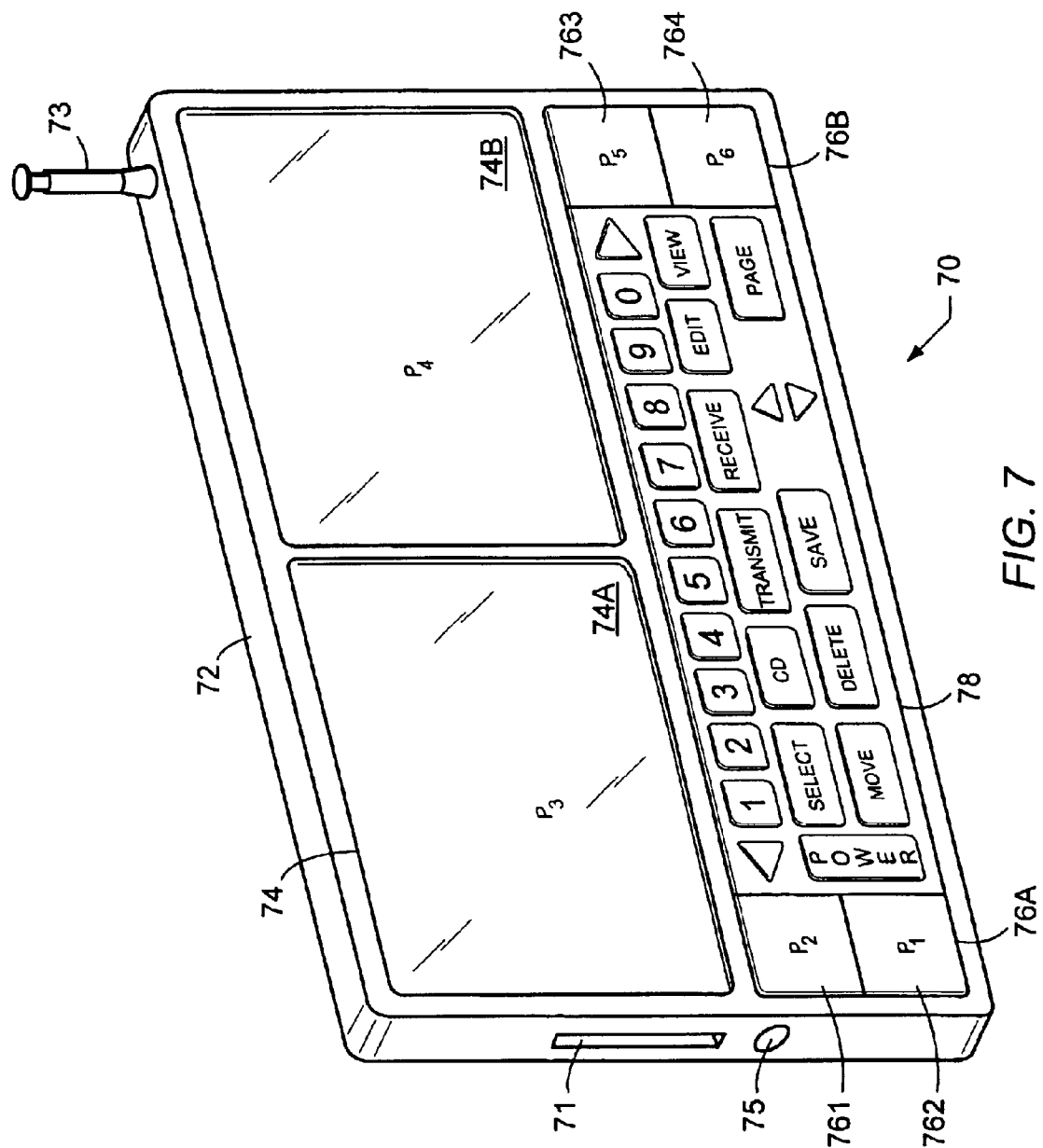
FIG. 7 depicts a single-housing embodiment for a digital photo album or an electronic book. Data transfer ports are also shown.

The designated areas denoted by the text PHOTO are shown in FIG. 5. When a user touches one of these designated areas, the text denoted by letters PHOTO lights up and a cursor starts blinking next to the text. The user may then enter at the position of the blinking cursor any decimal number through the number keys. The maximum decimal number that may be entered at the cursor location is equal to the total number of photographs stored on a given storage medium or in the system memory 66. Thus, an entry of decimal number 24 means that the user has selected $24^{th}$ photograph from, for example, a set of 30 photographs. The user then touches the MOVE text, and the digital photo album 50 automatically swaps the photograph displayed on the LCD display 54A, i.e. the photograph 541, with the $24^{th}$ photograph in the memory storage. In the situation of FIG. 5, the photograph $P_3$ will now become $P_{24}$ and vice-versa. Similarly, the PHOTO text on the touch-screen section 58B would swap a selected numbered photograph with the displayed photograph $P_4$. In an alternative embodiment, only one PHOTO "key" may be provided as shown in FIG. 7. There, the text denoted by letters PAGE has similar function to that denoted by letters PHOTO in FIG. 5. However, in the embodiment of FIG. 7, all photographs selected through the PAGE text are swapped with the photograph displayed on the LCD display 74A only. Photograph on the LCD display 74B is not affected. One skilled in the art can easily implement other variations in and modifications to this display methodology.

The function of the DELELTE "key" is to delete a selected photograph from the system memory 66. On the other hand, to save a selected photograph rather than the full content of the storage medium, the user may first SELECT the photograph and then touch the text denoted by letters SAVE. This will save into the system memory 66 only the selected photograph in the given digital format. The various commands, as described above, may be entered either through an embedded key-pad or through an appropriate touch-screen panel as described before with reference to FIG. 5. Besides these means to input commands, the command input unit also includes a command decoder 62 which is shown coupled to the LCD touch-screen panel 58 in FIG. 6. Thus, in the embedded key-pad embodiment, the command decoder 62 would be coupled to various embedded keys, as can easily be seen. The function of the command decoder 62 is to decode or identify which command has been entered through one of the touch-screens 58A, 58B or through a combination of embedded keys in the embodiment employing the key-pads instead of the touch-screens. The command decoder 62 sends an indication corresponding to the decoded command to the command processing unit 60. The command processing unit 60 processes the indication, thereby processing the command input by the user.

In processing the user-specified command, the command input unit 60 may interact with the floppy drive unit 63, the CD player unit 65, the system memory 66, the file viewer 67 and the page selection logic 64. In one embodiment, the full contents of a CD or a floppy disk containing one or more photographs in a digital format may first be downloaded, into the system memory 66 when the CD or the floppy disk is first inserted into the appropriate input port 51 or 53 respectively. The downloaded content of a storage medium is not automatically saved when the user turns off the POWER. To save all the photographs or some of them, the user may execute the SAVE function as described earlier. The page selection logic 64 receives an instruction from the command processing unit 60 and, in response, accesses the system memory 66 to retrieve the selected photograph as stored or downloaded therein. The retrieved photograph, in the digital format, would then be converted by the file viewer 67 into the user viewable video format prior to displaying it on one of the LCD displays in FIG. 5. The command processing unit 60, thus, performs an important control and processing function in the digital photo album 50. For example, the input port 51 may send an indication to the command processing unit 60 that a CD has just been inserted therein. The command processing unit 60, in turn, checks the system memory 66 for available storage space. If the memory is full, the command processing unit 60 instructs the CD player unit 65 to send to it as many photographs as could be displayed depending on the number of LCD screens and the order of the photograph in the total set. In an alternative embodiment, the command processing unit 60 may simply display a memory full indication through one of the LCD displays. If there is sufficient memory space, the command processing unit 60 may then instruct the CD player unit 65 to download the contents of the CD into the system memory 66. By performing necessary device control and instruction processing functions, the command processing unit 60 allows for enjoyable viewing of photographs in a way similar to a regular photo album.

Referring now to FIG. 7, another embodiment of a digital photo album 70 is shown. Here, a single housing 72 is provided, instead of the two housings as in FIG. 5. The first or primary LCD display 74 is internally divided into two LCD pages, 74A and 74B. Thus, the viewer gets an impression that a regular "page" of a photo album is being viewed. The housing 72 includes only one input port 71, but more than one input port may also be provided. This input port 71 may include a CD player or a floppy disk drive or a digital video disk drive as described earlier with reference to FIG. 5. In one embodiment, the digital photo album 70 may include a pair of secondary LCD displays, 76A and 76B, which are similar to those in FIG. 5, namely, displays 56A and 56B respectively. Thus, a further discussion with respect to the pairs of photographs, 761–762 and 763–764, displayed through these secondary LCD displays is not warranted. Further, the touch-screen panel or touch-screen LCD display 78 may also be implemented through an embedded key-pad as earlier described with reference to FIG. 5. In summary, the embodiment of FIG. 7 is functionally substantially similar to that of FIG. 5. Hence, only the distinguishing features of the digital photo album 70 are discussed herein.

Figure 8:
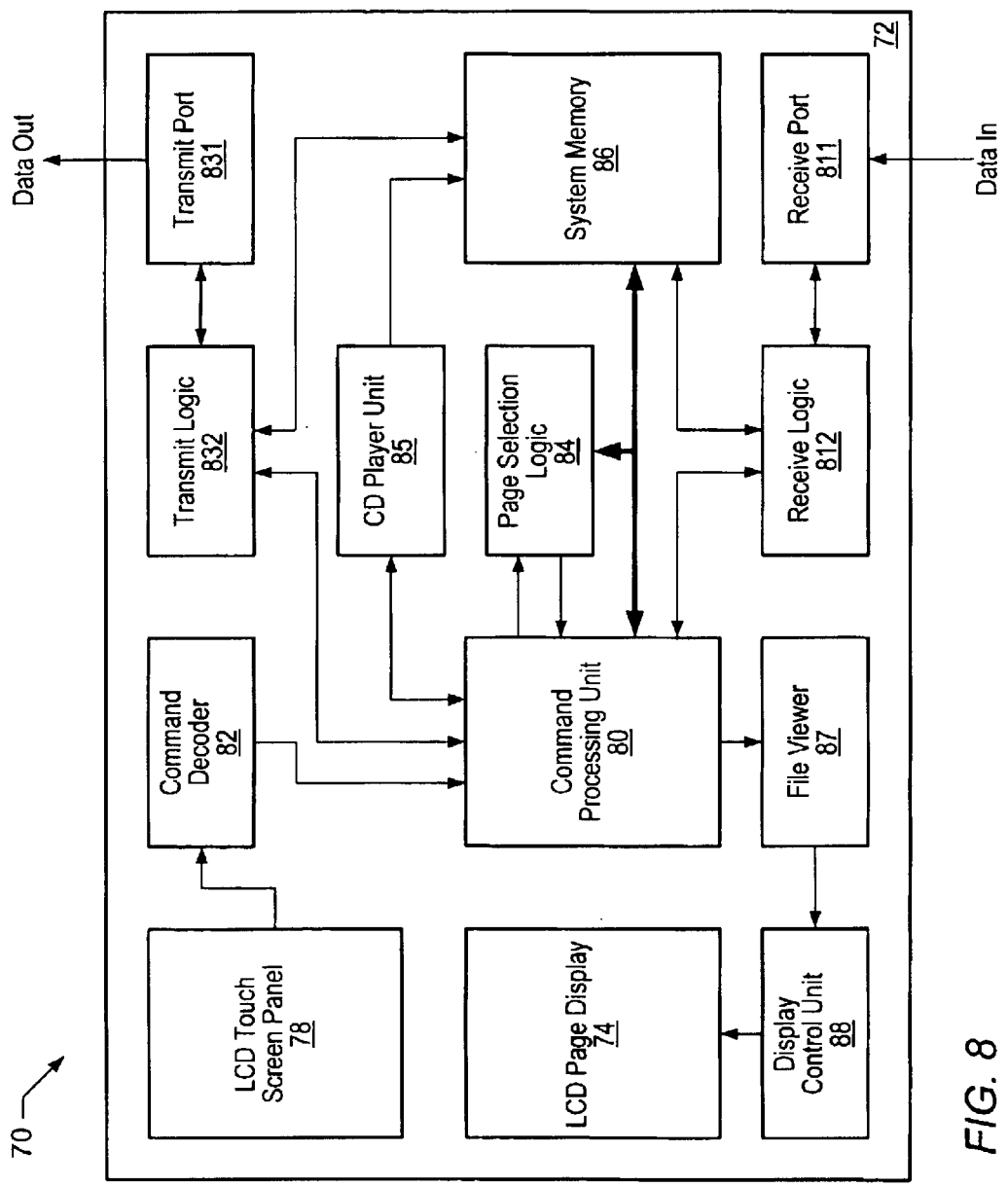
FIG. 8 shows an internal block diagram for the single-housing embodiment in FIG. 7. The photograph or text display screen is not touch-sensitive. The command input keys are implemented through a touch-screen panel.

Additionally, FIG. 8 represents the detailed block diagram for the digital photo album 70 in FIG. 7. The description of various functional blocks in FIG. 6 also applies to similarly named functional blocks in FIG. 8. For example, the LCD page display 74 includes all the LCD displays in the housing 72. These LCD displays include "pages" $P_1$ through $P_6$ as earlier discussed. Similarly, the command processing unit 80, the command decoder 82, the display control unit 88, the file viewer 87, the LCD touch-screen panel 78, the CD player unit 85, the system memory 86 and the page selection logic 84 function substantially similar to those described with reference to FIG. 6. Similar to the embodiment in FIG. 5, the embodiment in FIG. 7 may also represent an electronic book. Thus, the discussion herein with reference to a digital photo album equally applies to the electronic book. An observation is pertinent here. The EDIT "key" and the up/down arrows on the touch-screen panel 78 are preferably excluded from the embodiment in FIG. 7 if that embodiment represents a digital photo album. These command inputs are primarily intended for text editing function. Therefore, while discussing the embodiment of FIG. 7 as a digital photo album, the reference to these designated areas on the touch-screen panel 78 is omitted.

The digital photo album 70 in FIG. 7 has data transmission and reception capabilities. The housing 72 includes a transmit port 75, for example, an infrared (IR) transmit port, which is also shown as block 831 in FIG. 8. The transmit port 831 is configured to wirelessly transmit one or more photographs to an external receiving unit (not shown). The external receiving unit may include a personal computer with a built-in IR port for data transfer. In one embodiment, the transmit port 831 may also be configured to receive one or more photographs transmitted through an infrared signal. In that case, the external receiving unit may include another similar digital photo album (not shown). The housing 72 is shown to have an attached RF antenna 73. The RF antenna 73 is attached to the housing 72 through a receive port (not shown in FIG. 7), block 811 in FIG. 8. The receive port 811 is configured to wirelessly receive one or more photographs from an external transmitting unit (not shown). The external transmitting unit may include the computer system 10 shown in FIG. 1A. As previously mentioned, the computer system 10 may be configured to transmit digital data through RF antenna 16 (FIG. 1A). In an alternative embodiment, the receive port 811 may also be configured to transmit digital data through RF signals. One such embodiment is shown in FIG. 10 and discussed later with reference to the structure in FIG. 9. Hence, another similar digital photo album (not shown) may also transmit photographs in a digital format to the digital photo album 70. It is emphasized that the embodiment in FIG. 7 is for illustrative purpose only. The data transmission and reception structures may be readily designed as required by the designer of the digital photo album 70.

The LCD touch-screen panel 78 in FIG. 7 is substantially similar to the pair of touch-screens 58A and 58B in FIG. 5. In FIG. 7, some of the designated areas on the touch-screen panel 78 are not in pairs. For example, the touch-screen panel 78 has only one SELECT "key", only one MOVE "key", only one PAGE "key" (functionally equivalent to the PHOTO "key" in FIG. 5) etc. In the embodiment of FIG. 5, these and some other "keys" were provided in duplicate to allow convenient operation of the digital photo album 50. But, a designer may choose not to provide such "keys" in pairs. The functionality, however, of these touch-sensitive areas remains the same as that explained earlier with reference to FIG. 5. The same discussion applies to an embodiment having embedded keys instead of the touch-screen "keys." When a user touches the touch-screen area designated by the letters TRANSMIT (FIG. 7), the command decoder 82 interprets this transmit command and informs the command processing unit 80 of the selection of a transmission mode by the user. The command processing unit 80, in turn, sends a transmission initiation instruction to a transmit logic 832 (FIG. 8), which, in response, retrieves one or more photographs specified by the transmission initiation instruction from the system memory 86. The photographs retrieved would be in one of the digital storage formats described earlier. The transmit logic 832 supplies the digitized photographs to the transmit port 831 for appropriate carrier insertion, i.e. infrared or RF (radio frequency) as selected by the designer, prior to transmission to the external receiving unit.

When a user touches the touch-screen area designated by the letters RECEIVE (FIG. 7), the command decoder 82 decodes this receive request and informs the command processing unit 80 of the selection of a reception mode by the user. The command processing unit 80, in turn, sends a reception initiation instruction to a receive logic 812 (FIG. 8), which, in response, instructs the receive port 811 to establish a wireless communication link with the external transmitting unit. Once the communication link has been established, the receive port 811 initiates the data reception operation. The receive digital data is demodulated by the receive port 811 prior to sending them to the receive logic 812. The receive logic 812 then transfers the photographs received in a digital format to the system memory 86 for storage. This storage may be in a temporary storage area in the system memory 86, i.e. turning off the POWER may delete the content of the system memory 86 if not saved. In that case, the photographs will be displayed on the appropriate LCD displays automatically starting with the first received photograph. The user may then SELECT desired photographs and SAVE them, or may choose to SAVE all the received photographs in the memory for later viewing by simply touching the text SAVE on the touch-screen display 78. The user can thus accomplish a permanent storage of photographs. In one embodiment, the receive port 811 is configured to send an indication to the receive logic as soon as the receive port 811 receives a transmission message from the external transmitting unit. In this embodiment, the receive logic 812 automatically initiates the reception process. Thus, in this embodiment, the digital photo album 70 may exclude the touch-screen command RECEIVE or an embedded key marked with the letters RECEIVE if that design option is selected.

Figure 9:
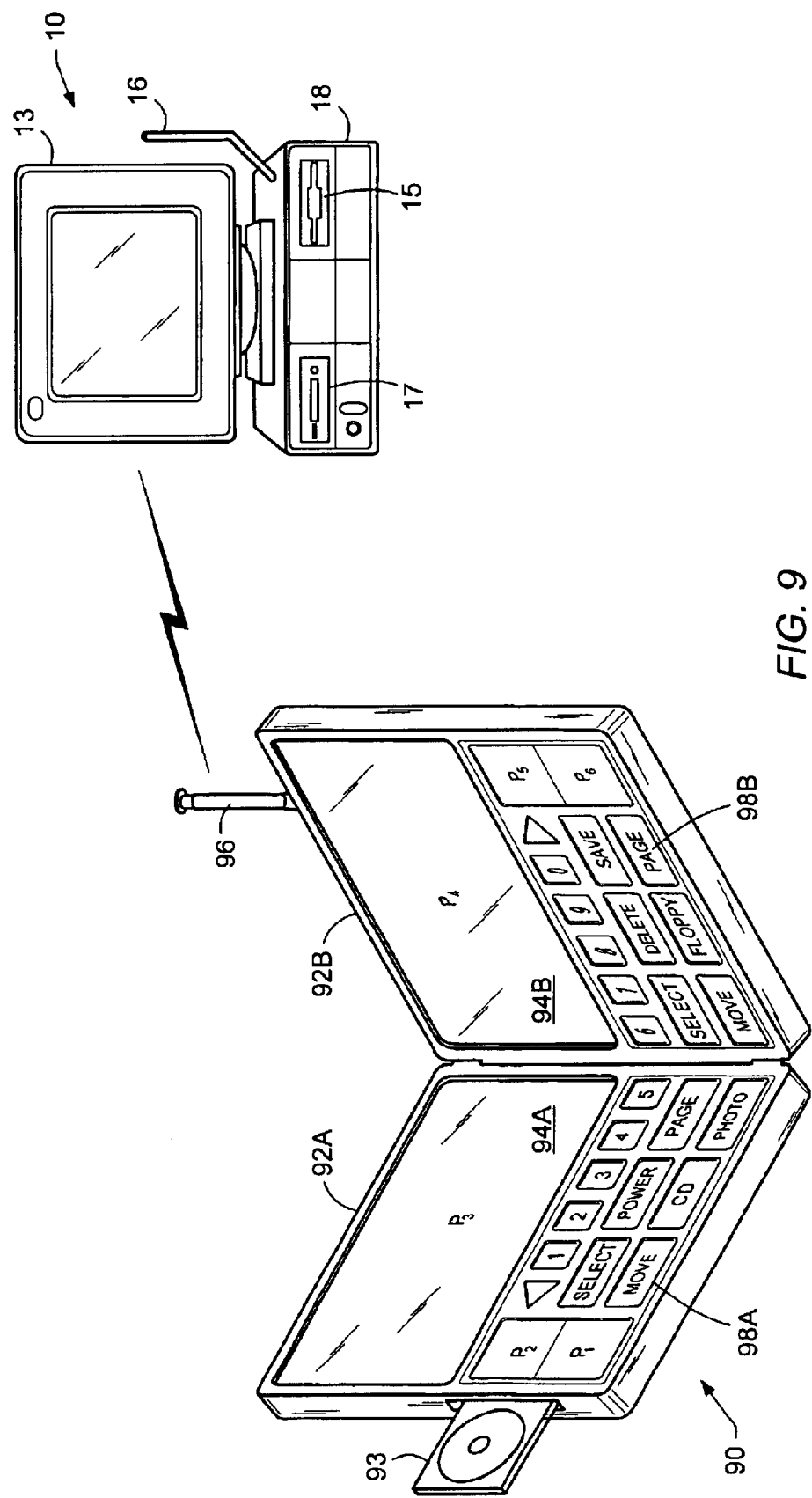
FIG. 9 displays an arrangement whereby a digital photo album or an electronic book communicates wirelessly with the computer system of FIG. 1A.
Figure 10:
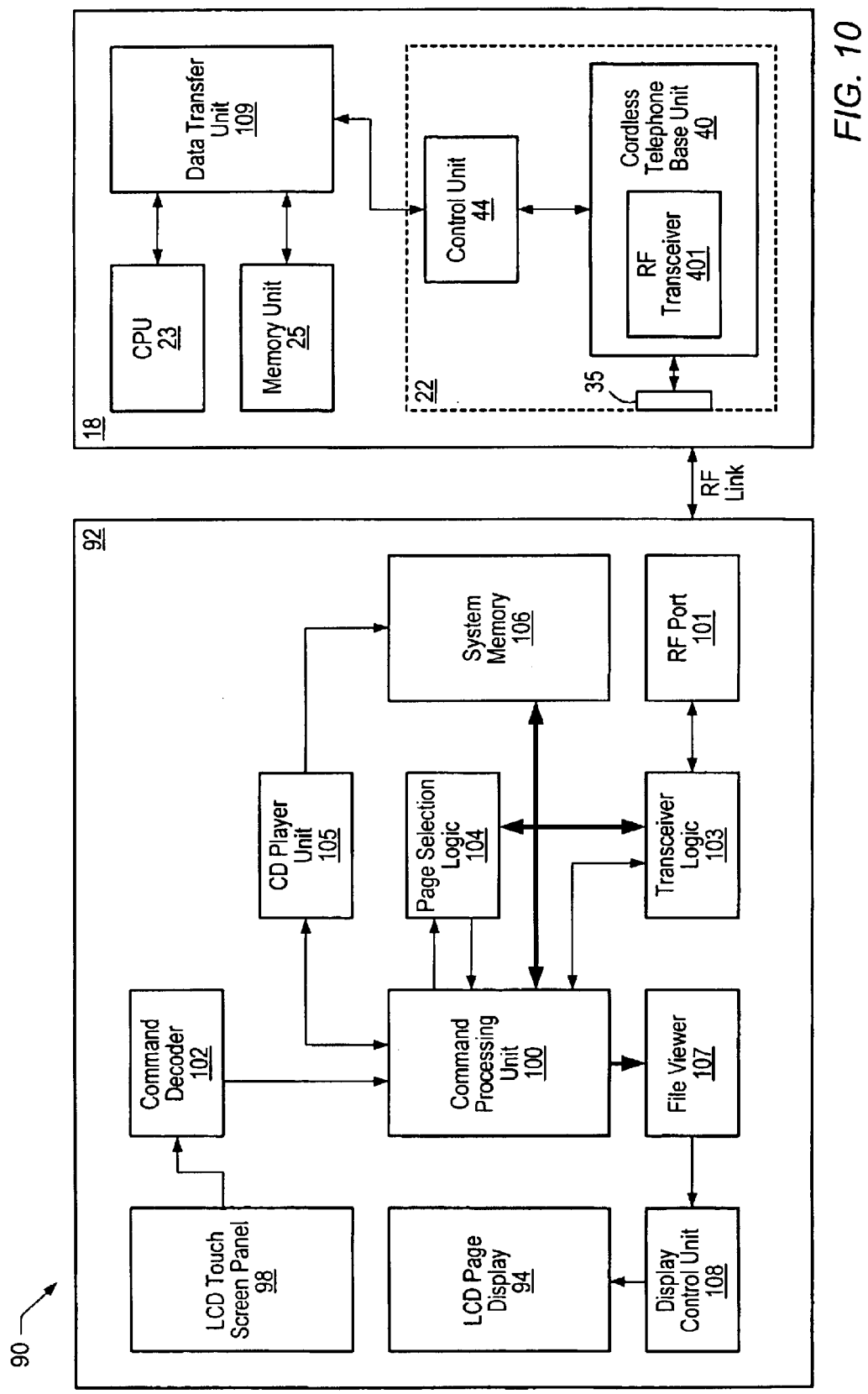
FIG. 10 is a block diagram representation for the arrangement in FIG. 9.

FIG. 9 shows an arrangement whereby a digital photo album 90 communicates with the computer system 10 (FIG. 1A) through an RF link. The digital photo album 90 is substantially similar to the embodiment in FIG. 5; hence, additional discussion of various elements is omitted. The two housings, 92A and 92B, are mechanically hinged to simulate a book-like photo album. The two primary LCD displays, 94A and 94B, are also shown. The embedded key-pad or the touch-screen panel, as the case may be, is divided into two sections, 98A and 98B. The digital photo album 90 has only one input port 93 on a side of the housing 92A. One skilled in the art may easily include more than one input port or choose a different physical location for the input port 93. The digital photo album 90 includes only one RF antenna 96 to transmit and receive digitized photographs. The computer system 10, as described earlier with reference to FIGS. 1A through 4, has a built-in cordless telephone card 22 (FIG. 10) that allows the computer system to operate as a cordless telephone base station. The RF antenna 16 is mounted on the computer system housing 18 and is electrically coupled to the antenna jack 35 (FIG. 10) provided on the cordless telephone card 22. The data transfer is thus achieved through an RF link established between the two antennas, 96 and 16.

Referring now to FIG. 10, a detailed functional block diagram for the arrangement of FIG. 9 is shown. The two individual housings, 92A and 92B, are collectively referred to as the housing 92. The functions of various circuit elements comprising the digital photo album 90 are already discussed previously with reference to FIGS. 5–8. The LCD touch-screen panels, 98A and 98B, are collectively shown as the LCD touch screen 98, and various LCD displays are also collectively included as the LCD page display 94. Other circuit elements, such as the command decoder 102, the command processing unit 100, the file viewer 107, the display control unit 108, the CD player unit 105, the page selection logic 104 and the system memory 106 are similar to those shown in FIGS. 6 or 8. Hence, a further discussion of the functions performed by these circuit elements is not needed. As mentioned earlier with reference to FIG. 8, the transmit port 831 may be the same as the receive port 811. One such embodiment is represented in FIG. 10. The RF port 101 performs both data transmission as well as data reception functions. The RF antenna 96 is connected to this RF port 101. In one embodiment, this RF antenna 96 is detachable.

The transceiver logic 103 performs the functions previously individually performed by the transmit logic 832 and the receive logic 812 (FIG. 8). Thus, data transmission and data reception is accomplished by the transceiver logic 103 through the RF port 101 and the RF antenna 96. The earlier discussion regarding the interaction of the transmit logic 832, the receive logic 812, the command processing unit 80 and the system memory 86 (FIG. 8) equally applies to the functions associated with the transceiver logic block 103. Hence, additional discussion in that regard is not warranted. The computer system 10 may be configured to accomplish digital data transfer through the cordless telephone base unit 40 comprised in the cordless telephone card 22. The external antenna 16 is coupled to the antenna jack 35 on the cordless telephone card 22 as mentioned earlier. The computer system 10 may include a data transfer unit 109 to facilitate a data transfer operation by the user with the help of the VDU 13 and an external input device, such as an alpha-numeric keyboard (not shown). The data transfer unit 109 may include a software to control data transfer operations involving the CPU 23, the system memory 25, the cordless telephone card 22 and the digital photo album 90. Preferably, the cordless telephone card 22 communicates with the data transfer unit 109 through the expansion bus 24, here the PCI bus 24 (FIG. 2).

When a user inputs a command to transmit one or more photographs stored in an external computer storage medium (not shown), such as a floppy disk or a compact disc, or in the computer system memory unit 25, the data transfer unit 109 may identify this user request and inform the CPU 23 of the user request. The CPU 23 may then instruct the data transfer unit 109 to initiate a data transmission operation. In this data communication mode, the data transfer unit 109 retrieves the necessary digitized photographs from the memory unit 25 and sends this digital data, either in the form of a number of data packets or in the form of a data stream, to the control unit 44 over the PCI bus 24. The control unit 44 receives and transfers the digital data to the cordless telephone base unit 40 to be converted into appropriate RF signals for transmission by an RF transceiver 401 comprised in the cordless telephone base unit 40. When the cordless telephone base unit 40, through its RF transceiver 401, receives RF signals from the RF port 101 containing digitized photographs, it transfers these signals to the control unit, which, in turn, demodulates the received RF signals to recover therefrom the sent digital information, either in the form of a number of data packets or in the form of a data stream. The recovered digital data may then be sent to the data transfer unit 109, which, in turn, may store the digitized photographs in a temporary storage in the memory unit 25. The data transfer unit 109 may be configured to automatically receive the photographs sent by the digital photo album 90 without interrupting the CPU 23 or without waiting for the user approval. In the alternative, the user may first enter a receive authorization command through the VDU 13 with the help of the external input device; and the data transfer unit 109 then prepares the control unit 44 to execute a data reception operation. The first of the received photographs may automatically be displayed on the VDU 13 by the data transfer unit 109 or the displaying of one or more photographs may be delayed until the user authorizes such an action.

The foregoing discussion with reference to FIGS. 5 through 10 focused on a portable digital photo album with LCD displays to display one or more photographs in a user viewable format. As already mentioned before, the same discussion with reference to FIGS. 5 through 10—involving a digital photo/image album to view one or more photographs/images stored in a digital format—also applies to the electronic book containing a number of pages according to the present invention because of a substantial similarity between the digital photo album and the electronic book. Thus, for example, the embodiment in FIG. 5 may also show an electronic book 50 with two housings, 52A and 52B, with two primary displays, for example, LCD displays, 54A and 54B, with one or more input ports 51, 53 etc. In the preferred embodiment of the electronic book 50, a text denoted by letters PAGE replaces the PHOTO "key" shown in the embodiment of FIG. 5 to indicate the primary nature of the displayed digitized data. The functions of various logic blocks in FIG. 6, however, remain substantially the same. For example, the LCD display 54A displays one page of the electronic book 50. That page may be stored in the system memory 66 in one of the digital formats given below, or that page may be directly "read" from a storage medium containing a digitized version of a regular, paper book.

It is noted that the electronic book 50 is utilized to read "pages" of information where each "page" contains a text and, occasionally, an image. This method of displaying "pages" simulates a real book with the added flexibility that the user may read different books through the same electronic book. For example, the user may read a first book from a CD and a second book from a floppy disk. In both of these cases, only one electronic book may be needed. This allows greater flexibility and mobility during travel, and even during leisurely reading. The text contained in the electronic book "page" may be stored in one of a number of digital formats. For example, the file containing a text may have extension TXT (for ASCII texts), RTF (Rich Text Format for compressed data files), PDF (Portable Document Format for Adobe® files), ZIP (for compressed files), LZW (Lempel-Ziv-Welsh compression algorithm) or any other text file extension. In one embodiment, a word-processing application may be provided, and one or more word-processing files with program-specific extensions may also be read through the electronic book 50. Similarly, one or more images contained in the electronic book "page" may be stored in one or more of the digital formats earlier described with reference to the photographs in a digital photo album. In addition to the earlier described file extensions, such as GIF, JPG, TIFF etc., the image in the electronic book 50 may be stored in the PDF format as part of a whole page stored in that format. The file viewer 67 is configured to recognize a number of digital formats and convert the text and images into a user viewable format prior to sending them to the display control unit 68.

A second embodiment of the electronic book is shown in FIG. 7. As mentioned earlier, the electronic book 70 displays pages containing text and, occasionally, images for allowing the user to have a book-like reading. The difference between the earlier described digital photo album of FIG. 7 and the present electronic book in FIG. 7 is the additional touch-sensitive areas designated by the letters EDIT and by the icons for up/down arrows. The electronic book 70 may be provided with a text-editing functionality to allow user to "cut", "paste" or "delete" a text. Additional sophisticated word processing functions may be provided if desired. The command processing unit 80 is modified to include a text editor program to edit text files. The user either SELECTs a whole page displayed on one of the two primary displays, 74A and 74B, or a portion of a page for editing. The user may not edit a page if it is not displayed on one of the primary displays. The selection of a whole page is accomplished by repeatedly touching the designated area denoted by the letters SELECT until the desired page is highlighted. The user may then DELETE the complete text, along with any image, contained in the selected page or perform a MOVE operation to effectively "cut" the text from the displayed page and "paste" the selected text to a different page. Any image contained in the selected page will also be selected and will also MOVE to the next location along with any selected text.

To select and edit only a portion of the text from the displayed page, the EDIT "key" is provided. For example, to delete one paragraph from a page displayed on one of the primary LCD displays, 74A and 74B, the user first SELECTs the displayed page and then touches either of the icons denoting up or down arrows. The command processing unit 80 is configured to instruct the display control unit 88 through the file viewer 87 to display a blinking cursor on the bottom or top left hand corner of the selected page depending on whether down or up arrow icon is touched first. The selected page will not be highlighted now, but the cursor will be blinking on the page instead. The user may, then, position the cursor at the beginning of the portion of the text to be selected. The user then selects only the desired portion of the text by keeping the EDIT "key" pressed while moving the cursor with the help of various arrow icons over the desired portion of the text. The selected portion of the text will now be highlighted as the cursor move along the text. After completing the selection, the user may perform DELETE, MOVE, TRANSMIT etc. operations on the selected portion of the text. In one embodiment, a touch-screen area designated by letters VIEW is provided to enable the user to view the file last received by the electronic book 70. The VIEW function may also be provided in a digital photo album to similarly view the last file of photographs received by the digital photo album. Additional functions through additional "keys" may also be provided as desired, or the electronic book and the digital photo album may be configured to implement a different set of functions utilizing a similar or different combinations of the touch-screen areas or embedded keys as the case may be. Finally, the prior discussion with respect to the arrangement in FIGS. 9 and 10 also equally applies when the embodiment in FIG. 9 is an electronic book 90, instead of the earlier described digital photo album. Hence, for the sake of brevity, the discussion regarding FIGS. 9 and 10 is not repeated for the electronic book 90 according to the present invention.

Figure 11:
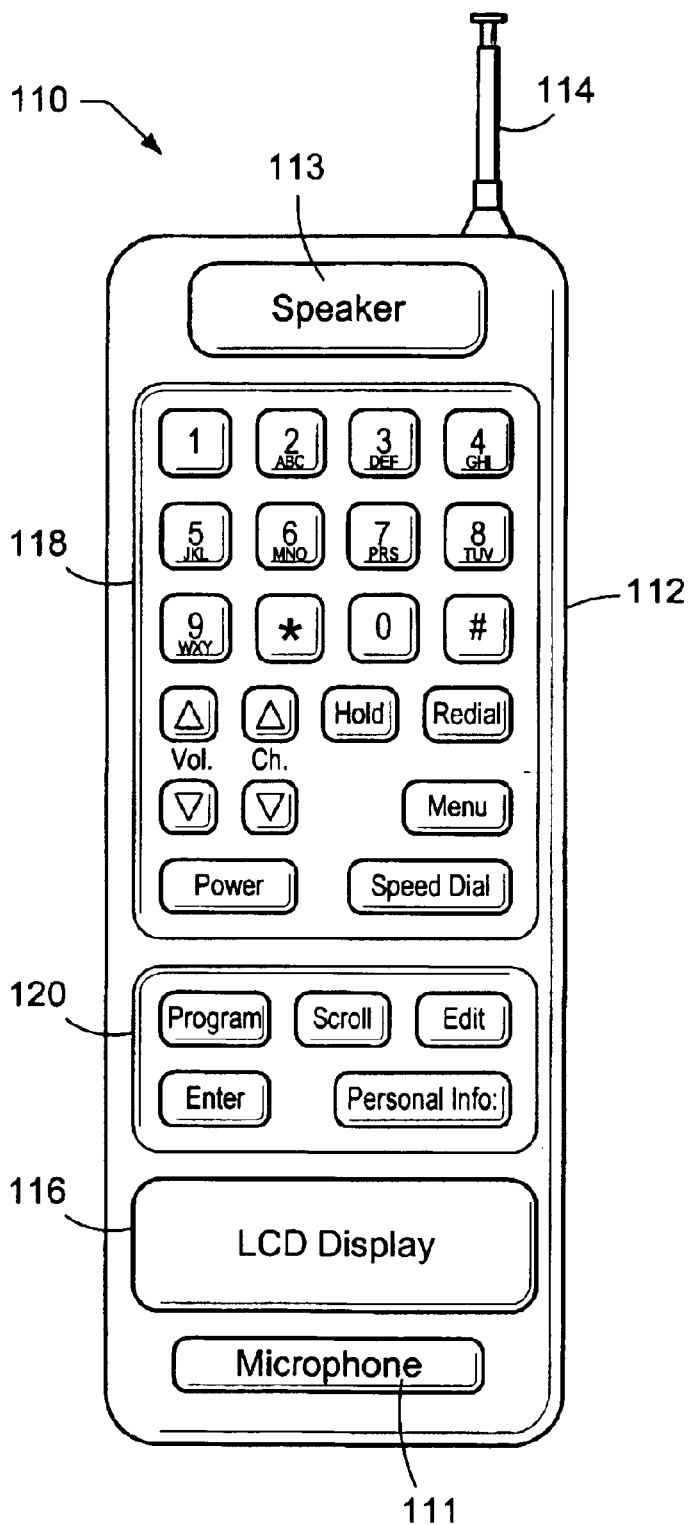
FIG. 11 shows a cordless telephone handset that identifies the user operating the handset and automatically configures itself to implement one or more preferences specified by that user.
Figure 12:
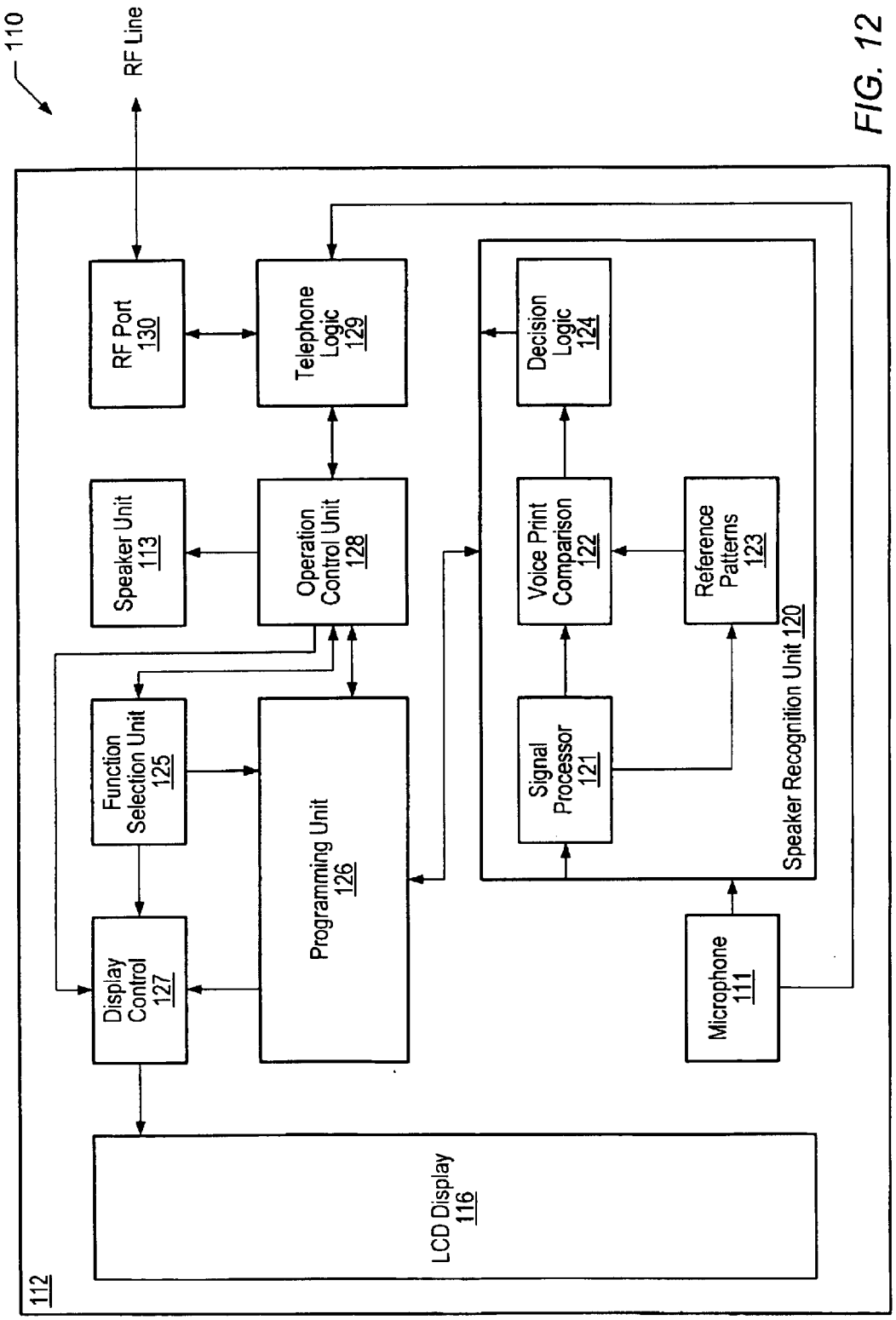
FIG. 12 is a corresponding internal block diagram for the cordless telephone handset in FIG. 11.

Referring now to FIGS. 11 and 12, a cordless telephone handset 110 that identifies the user operating the handset and automatically configures itself to implement one or more preferences specified by that user is shown. The cordless telephone handset 110 may be used in conjunction with the computer system 10 (FIG. 1A), where the computer system functions as the cordless telephone base station for the handset unit 110. In the alternative, a regular cordless telephone base unit (not shown) may also be employed. The cordless telephone handset 110 has a housing 112 that includes a microphone to convert a human voice signal into an analog electrical signal, and a speaker 113 to convert an audio signal into an audible sound as is known in the art. An RF port 130 (FIG. 12) is provided to establish a communication link between a regular cordless telephone base unit (not shown) or the computer system 10 (FIG. 1A). An RF antenna 114 attaches to an opening (not shown) provided in the housing 112 to connect to the RF port 130. This cordless telephone handset unit 110 includes in its housing 112 a speaker recognition unit 120 (FIG. 12) to ascertain an identity of the operator of the handset 110.

The speaker recognition unit 120 employs digital signal processing principles to identify who the speaker is. This is distinguished from a speech or voice recognition system focusing on the recognition of the content of a speaker's speech, i.e. on what the speaker said instead of who the speaker is. The reference unit 123 stores a number of voice prints or voice patterns, with one voice print per operator of the handset unit 110. The voice print of a speaker may carry an information about the pitch of that speaker's voice. This information may be in the form of a vector containing a predetermined number of binary bits, for example 32 bits. A more sophisticated signal processing may utilize different pattern vectors to represent various features of the speech signal that are relevant to speaker identity. During a telephone conversation, a signal processor 121 periodically processes the analog electrical signal received from the microphone 111. The duration of processing may be predetermined. This processing of the microphone signal results in a generation of a voice print of the current speaker. A voice print comparison unit 122 compares this voice print with all the voice prints stored in the reference unit 123 and generates a result signal. The comparison may be of frequency content of two voice prints to identify whether both have the same pitch. The result signal may be generated at the completion of all comparisons indicating an absence of a match between a voice print stored in the reference unit 123 and that of the operator currently operating the handset unit 110. Alternately, the result signal may be generated immediately upon finding a match between the voice print of the current user and a voice print stored in the reference unit 123. The result signal may include the matching voice print from the reference unit 123 along with a pulse indicating a match of the voice prints. The result signal without the pulse and the matching voice print at the end of the predetermined processing duration may indicate an absence of a matching voice print in the reference unit 123.

A decision logic 124 in the speaker recognition unit 120 receives the result signal from the voice print comparison unit 122 and responsively transmits an indication to a programming unit 126. The indication may be a signal in a predetermined form indicating an absence of a matching voice print, such as when the result signal is without the pulse; or, the indication may be one of a plurality of digital representations when the result signal contains the pulse. The digital representation depends on the matching voice print supplied through the result signal. As described later, each user of the cordless telephone handset 110 stores his/her reference voice print using various keys provided on the housing 112. During that process, the user also stores in the programming unit 126 an identifier for that user. The programming unit 126 combines this user identifier with a data extracted from the voice print of the user to generate a unique digital representation for that user. The same user-specific digital representation is also stored in the decision logic 124 during that reference voice print storage process. The digital representation may be in the form of an eight-bit byte or a 16-bit word or in any other convenient digital format depending on the number of users and on the complexity level of the speech signal processing.

Thus, the decision logic 124 operates on the voice print supplied through the result signal and extracts the same data as were earlier extracted by the programming unit 126 during the reference voice print storage process. The decision logic 124 uses these data to determine a corresponding digital representation from the plurality of digital representations stored in the decision logic 124. That corresponding digital representation is then sent to the programming unit 126 as an indication of the determination of the current telephone handset operator's identity. The programming unit 126 then instructs an operation control unit 128 to configure one or more features of the cordless telephone handset 110 according to one or more user-specific preferences earlier stored in the programming unit 126 by the current operator of the cordless telephone handset 110.

The cordless telephone handset 110 operates in two basic modes: (1) A telephone mode, and (2) a program mode. During the telephone mode, the cordless telephone handset 110 functions as a regular cordless telephone handset and communicates with an external base unit (not shown). The telephone logic 129 receives an analog electrical signal from the microphone 111 and generates an RF signal therefrom for transmission through the RF port 130 over the RF link established by the antenna 114. An RF signal received by the RF port 130 from the external base station (not shown) is converted into an audio signal by the telephone logic 129 and fed to the speaker unit 113 through the operation control unit 128. The operation control unit 128 will process this audio signal to maintain the volume of the audible sound heard from the speaker 113 to the level earlier programmed by the user during the program mode. Thus, different speaker volumes may be maintained for different users of the handset 110, even during a single telephone communication because of the periodic processing of a speech signal by the speaker recognition unit 120 irrespective of the number of users. As described below, the operation control unit 128 may also display a variety of other user-specific information through the LCD display 116 during a telephone communication. Thus, the information displayed through the LCD display 116 will change as the user of the handset 110 changes during a telephone conversation.

The housing 112 contains a first plurality of keys 118 (FIG. 11) to allow a user to select a telephone mode and to carry out a telephone conversation. Some of this first plurality of keys 118 include conventional cordless telephone handset keys and hence no further discussion regarding the same is needed. This first plurality of keys 118 may also be used to allow a user to program his/her user-specific preference when a program mode is selected. A user-specific preference may include a set of speed-dial numbers, name of the user, date of birth of the user, social security number for the user, types and numbers of one or more credit card accounts, numbers of one or more bank accounts, names of the banks where bank accounts are maintained, one or more alphanumeric passwords associated with various credit and bank accounts, etc. A second plurality of keys 120 may also be used in conjunction with the first plurality of keys 118 to further allow the user to execute various programming options. For example, the user may EDIT his/her data at some later point when the user wishes to change the earlier entered data.

A function selection unit 125 is coupled to the first and the second plurality of keys 118, 120 to identify the mode of operation selected by the user. For example, when the user engages the POWER key, the handset 110 automatically enters the telephone mode and any keys pressed thereafter will be identified by the function selection unit 125 as part of the telephone mode and that identification will be conveyed to the operation control unit 128 to facilitate a telephone communication through the telephone logic 129. On the other hand, after the POWER key is pressed, the user may engage the PROGRAM key to discontinue the default telephone mode and, instead, enter a program mode. The function selection unit 125 will inform the programming unit 126 of this user selection. The programming unit 126 is also coupled to the first and the second plurality of keys 118, 120 to receive and store various user choices input during the program mode. An LCD display 116 may be provided on the housing 112 to enable the user to view his/her choices being input during the program mode or being displayed during the telephone mode. The programming unit 126 and the operation control unit 128 are coupled to a display control 127 to facilitate display of various user-specific information and choices through the LCD display 116 during the program mode as well as during the telephone mode. One or more keys from the first and the second plurality of keys may be implemented through a touch-screen LCD panel in a manner similar to that earlier described with reference to the digital photo album and the electronic book according to the present invention.

Some exemplary programming operations are described now. Initially, the user engages the PROGRAM key and speaks a set of pre-selected phrases into the microphone 111 to program a reference voice print for that user. The phrases to be spoken are typically provided by the manufacturer in a printed form, or, alternately, those phrases may be displayed on the LCD display 116. The LCD display 116 may prompt the user at each step of the programming process to input requisite data and/or speech. The user then engages the ENTER key to signal the programming unit 126 to receive that user's voice print from the speaker recognition unit 120. The user then enters one or more user identifiers with the help of the first plurality of keys 118. The user identifiers may include a name selected by the user, an alphanumeric password selected by the user, or any similar identification information. The name selected by the user may not be identical to the actual name of the user. Additionally, the password selected by the user also need not be identical to one or more passwords the user will later be allowed to store as user-specific preferences. After entering the user identifiers, the user again engages the ENTER key to signal the programming unit 126 to generate from the user identifiers and the user voice print a unique, user-specific digital representation and store that digital representation in itself as well as into the decision logic 124 as described earlier. This unique digital representation helps decision logic 124 identify the user of the handset 110 during the telephone mode. The user-specific preferences are also digitally saved in the programming unit 126.

The operation control unit 128 is configured to instruct the display control 127 to receive data from the programming unit 126 that is to be displayed on the LCD display 116 during the program mode as well as during the telephone mode. A typical display during the telephone mode may include the last telephone number dialed by the current user as previously stored in the programming unit automatically when the user dialed that telephone number, the speed-dial numbers programmed by the current user, a visual representation of the speaker volume previously programmed by the current user, another visual representation indicating the current mode as the telephone mode, any personal information earlier programmed by the current user, one or more of the user identifiers earlier entered by the current user during the program mode, etc. The visual representation of the speaker volume set by the user may include a decimal scale, a decimal number, a variable length bar chart, etc. The telephone mode may be visually represented by a telephone icon or by an appropriate text message. Similarly, a typical display during the program mode may include each data entered by the user and a corresponding text identifying the data entered. The data entered may include one or more speed dial numbers of user's choice, personal information including complete name, date of birth, social security number, etc., and one or more of the user identifiers. During the program mode, the user may also set the desired volume for the speaker 113. The LCD display 116 may also identify the program mode through an appropriate icon or text message. The operation control unit 128 may be configured to allow a user to protect user-specific preferences with a user-selected password. The operation control unit 128 would then instruct the programming unit 126 not to display this user-specific information during the telephone mode even if the user is the current operator of the handset 110 unless the user engages the PERSONAL INFO key and then ENTERs the appropriate password when prompted by the LCD display 116.

The user may change previously programmed information by reentering the program mode and reprogramming the necessary changes or by engaging the MENU key during the telephone mode. As this is not an initial programming operation, the user need not speak the test phrases to store his/her voice print. The function selection unit 125 will indicate this user choice to the operation control unit 128 and the operation control unit 128 will, in turn, instruct the display control 127 to display all the items on the LCD display 116 that the user may program. The user may use the SCROLL function to select one or more individual items and reprogram them as desired. The SCROLL function may also be available during the program mode to select specific items for programming. Alternately, during the telephone mode, the user may select the EDIT function that will display all previously programmed data by that user. The user may then reprogram one or more of the displayed data or may go back to MENU command for a display of all program options.

As described earlier, the operation control unit 128 plays a key part in configuring the handset 110 with the parameters specific to a particular user at any given time. The operation control unit 128 may be configured to allow dynamic reconfiguration of the handset 110 whenever more than one user partakes in a single telephone communication. Due to frequent periodic processing of the analog electrical signals received from the microphone 111, the speaker recognition unit 120 is able to identify a change of speaker when the new speaker's voice print matches with one of the reference voice prints stored in the reference unit 123. The identity of the new operator of the handset 110 is then conveyed to the operation control unit 128 by the programming unit 126. The operation control unit 128, then, instructs the programming unit 126 to send the new user-specific data to the display control unit 127 for display through the LCD display 116. The operation control unit 128 also interacts with the telephone logic 129 and the speaker unit 113 to reconfigure one or more parameters for the handset unit 110. For example, the new user may have programmed a different level of audio volume for the speaker 113. In that case, the operation control unit 128 will process audio signals received from the telephone logic 129 to comply with the new user's desired level of audible sound.

The cordless telephone handset 110 may be configured to allow the initial voice print programming during the telephone mode. In that case, the user's voice may be analyzed to generate voice print dynamically during a telephone conversation; and the user may be prompted through the LCD display 116 to enter the user identifiers as well as other user-specific preferences without interrupting the telephone mode and entering into the program mode. In one embodiment, the operation control unit 128 is configured to instruct the programming unit 126 to display a greeting message through the LCD display 116 as soon as the speaker recognition unit 120 first ascertains the identity of the current operator of the handset 110. The greeting message may personally identify the handset operator by displaying his/her user name stored as part of the user identifier information, or, alternately, the greeting message may display the name user earlier entered as part of user-specific personal information. Various other announcements and modes of operation may be implemented as desired by the circuit designer.

The foregoing discussion with reference to the cordless telephone handset 110 is equally applicable to a regular, i.e. non-cordless, telephone instrument (not shown). The regular telephone instrument is directly connected to an external telephone line, and, hence, the RF port 130 (FIG. 12) is not necessary. In all other respects, the invention can equally be implemented with a regular telephone instrument. Hence, the foregoing discussion is not repeated with respect to a non-cordless, regular telephone instrument that also identifies the user operating the telephone instrument and automatically configures itself to implement one or more user-specified preferences.

While the invention is susceptible to various modifications and alternative forms, specific embodiments thereof are shown by way of examples in the drawings and are herein described in detail. It should be understood, however, that the drawings and detailed description thereto are not intended to limit the invention to the particular forms disclosed, but on the contrary, the intention is to cover all such modifications, equivalents and alternatives as falling within the spirit and scope of the present invention as defined by the appended claims.

What is claimed is:

1. A computer system comprising:
    an expansion bus;
    a CPU coupled to said expansion bus;
    a memory coupled to said expansion bus;
    a sound device coupled to said expansion bus, wherein said sound device is configured to couple to an external telephone line to perform a telephone transmission and a telephone reception, wherein the sound device performs audio functions for the computer system; and
    a cordless telephone device coupled to said expansion bus, wherein said cordless telephone device is coupled to said sound device and is in wireless communication with an external cordless telephone handset, and wherein said cordless telephone device is configured to allow a user to perform said telephone transmission and said telephone reception over said external telephone line in a cordless fashion using said cordless telephone handset.

2. The computer system as in claim 1, wherein said expansion bus is one of the following:
    a PCI bus; a FireWire bus; a USB bus; and an FC-AL bus.

3. The computer system according to claim 1, further comprising:
    a motherboard including:
        said expansion bus;
        said CPU;
        said memory; and
        a plurality of connector slots coupled to said expansion bus, wherein said sound device is installed into a first one of said plurality of connector slots, and wherein said cordless telephone device is installed into a second one of said plurality of connector slots.

4. The computer system of claim 1, wherein said sound device includes:
    a microphone jack to receive a transmit audio signal;
    a speaker jack to transmit a receive audio signal to reproduce therefrom an audible sound through a speaker; and
    a telephone line jack to transmit a first telephone signal over said external telephone line and receive a second telephone signal through said external telephone line, wherein said sound device is configured to convert said transmit audio signal into said first telephone signal during said telephone transmission over said external telephone line, and wherein said sound device is further configured to convert said second telephone signal into said receive audio signal during said telephone reception through said external telephone line.

5. The computer system as in claim 4, wherein said cordless telephone device includes:
    an antenna jack to couple an external RF antenna thereto, wherein said external RF antenna is configured to transmit a first RF signal and receive a second RF signal, wherein said first and said second RF signals represent a modulated human voice signal;
    a microphone output coupled to said microphone jack in said sound device, wherein said cordless telephone device is configured to receive said second RF signal from said antenna jack and to transmit in response thereto said transmit audio signal; and
    a speaker input coupled to said speaker jack in said sound device, wherein said cordless telephone device is configured to receive said receive audio signal and to transmit in response thereto said first RF signal to said antenna jack, thereby allowing said telephone transmission and said telephone reception in said cordless fashion.

6. The computer system of claim 5, wherein said cordless telephone device includes a cordless telephone base unit coupled to said external cordless telephone handset through said antenna jack, wherein said cordless telephone base unit is configured to receive said second RF signal from said antenna jack and to generate in response thereto said transmit audio signal, and wherein said cordless telephone base unit is further configured to receive said receive audio signal and to transmit in response thereto said first RF signal to said antenna jack.

7. The computer system according to claim 6, further comprising:
    an external data input device; and
    an external visual display unit (VDU),
    wherein said sound device is configured to dial a first telephone number provided through a first request by said user to carry out said telephone transmission and said telephone reception using an Internet, wherein said computer system is configured to allow said user to input said first request using said external data input device and said external VDU, wherein said sound device is configured to allow said telephone transmission and said telephone reception using said Internet in a half-duplex mode, and wherein said cordless telephone base unit is configured to allow said user to carry out said telephone transmission and said telephone reception in said cordless fashion over the Internet using said cordless telephone handset.

8. The computer system of claim 7, wherein said cordless telephone base unit is configured to dial a second telephone number provided through a second request by said user to carry out said telephone transmission and said telephone reception using a circuit-switched network, wherein said computer system is configured to allow said user to input said second request through said external data input device and said external VDU, wherein said cordless telephone device is configured to allow said telephone transmission and said telephone reception using said circuit-switched network in a full-duplex mode, and wherein said cordless telephone base unit is configured to allow said user to carry out said telephone transmission and said telephone reception in said cordless fashion over said circuit-switched network using said cordless telephone handset.

9. The computer system as in claim 8, wherein said cordless telephone device further includes:
   a hybrid coupled to said microphone output and said speaker input, wherein said hybrid is configured to mix said transmit audio signal and said receive audio signal to facilitate said telephone transmission and said telephone reception in said half-duplex and said full-duplex modes; and
   a control unit coupled to said cordless telephone base unit and said hybrid, wherein said control unit is configured to communicate with said sound device over said expansion bus and establish a telephone communication path linking said cordless telephone base unit, said hybrid and said sound device.

10. The computer system according to claim 9, wherein said hybrid includes an echo cancellation circuit.

11. The computer system of claim 9, wherein said computer system is configured to allow said user to store a plurality of telephone numbers in said memory using said external data input device and said external VDU, wherein said plurality of telephone numbers includes said first and said second telephone numbers, wherein said sound device and said control unit in said cordless telephone device are configured to access said memory through said expansion bus to retrieve said first and said second telephone numbers in response to said first and said second requests respectively, and wherein said control unit is configured to provide said second telephone number to said cordless telephone base unit in response to second request.

12. The computer system of claim 1, wherein the cordless telephone device is a card physically coupled to a slot of the expansion bus.

13. A cordless telephone device configured to be operative through a computer system, said cordless telephone device comprising:
   an antenna jack to couple an external RF antenna thereto, wherein said external RF antenna is configured to transmit a first RF signal and receive a second RF signal, wherein said first and said second RF signals represent a modulated human voice signal;
   a cordless telephone base unit coupled to said antenna jack, wherein said cordless telephone base unit is configured to receive said second RF signal from said antenna jack and to generate in response thereto a transmit audio signal, wherein said cordless telephone base unit is further configured to receive a receive audio signal and to transmit in response thereto said first RF signal to said antenna jack;
   a microphone output coupled to said cordless telephone base unit to receive said transmit audio signal; and
   a speaker input coupled to said cordless telephone base unit to transmit said receive audio signal thereto,
   wherein said cordless telephone device is configured to be coupled to a sound device in said computer system through said microphone output and said speaker input, wherein the sound device performs audio functions for the computer system, wherein said sound device is to be coupled to a telephone line, and wherein said cordless telephone device is further configured to be coupled to a cordless telephone handset through said external RF antenna, thereby allowing a user to carry out a telephone transmission and a telephone reception over said telephone line in a cordless fashion using said cordless telephone handset.

14. The cordless telephone device as in claim 13, wherein said cordless telephone device is a cordless telephone card configured to be installed in a motherboard in said computer system.

15. The cordless telephone device as in claim 14, wherein said sound device is a computer sound card configured to be installed in said motherboard in said computer system.

16. The cordless telephone device of claim 13, wherein said cordless telephone base unit is configured to dial a telephone number when provided through said computer system by said user to carry out said telephone transmission and said telephone reception using a circuit-switched network, and wherein said cordless telephone device is configured to allow said telephone transmission and said telephone reception using said circuit-switched network in a full-duplex mode.

17. The cordless telephone device as in claim 13, further comprising:
   a hybrid coupled to said microphone output and said speaker input, wherein said hybrid is configured to mix said transmit audio signal and said receive audio signal to facilitate said telephone transmission and said telephone reception in a half-duplex mode and in said full-duplex mode; and
   a control unit coupled to said cordless telephone base unit and said hybrid, wherein said control unit is configured to communicate with said sound device and establish a telephone communication path linking said cordless telephone base unit, said hybrid and said sound device.

18. The cordless telephone device of claim 17, wherein said hybrid includes an echo cancellation circuit.

19. A computer system comprising:
   a housing;
   an expansion bus comprised in the housing;
   a CPU coupled to said expansion bus and comprised in the housing;
   a memory coupled to said expansion bus and comprised in the housing;
   a cordless telephone device coupled to said expansion bus and comprised in the housing, wherein said cordless telephone device is configured to couple to an external telephone line to perform a telephone transmission and a telephone reception, wherein said cordless telephone device is in wireless communication with an external cordless telephone handset, wherein said cordless telephone device is configured to allow a user to perform said telephone transmission and said telephone reception over said external telephone line in a cordless fashion using said cordless telephone handset and wherein said cordless telephone device implements audio functions in the computer system.

20. The computer system of claim 19, wherein said cordless telephone device includes:

a sound device coupled to said expansion bus and comprised in the housing, wherein said sound device is configured to couple to an external telephone line to perform a telephone transmission and a telephone reception.

21. A system comprising:

a motherboard coupled to a first connector slot and a second connector slot;

a cordless telephone device connected to the first connector slot;

a sound card connected to the second connector slot, wherein the sound card is configured to conduct communications over a telephone line and is configured to conduct communications over an Internet;

a peripheral component interconnect bus coupled to the first connector slot and the second connector slot;

an antenna jack connected to the cordless telephone device;

a radio frequency antenna electrically connected to the antenna jack; and a cordless telephone handset communicably coupled to the radio frequency antenna.

22. The system of claim 21, wherein the cordless telephone device is a cordless telephone card.

23. The system of claim 21, further comprising at least one external speaker coupled to the sound card to convert an audio signal into an audible sound, wherein the sound card provides the audio signal by converting a telephone signal.

24. A system comprising:

a motherboard comprising a first connector slot and a second connector slot;

a cordless telephone device connected to the first connector slot;

a sound card connected to the second connector slot, wherein the sound card is configured to conduct communications over a telephone line and is configured to conduct communications over an Internet;

a bus coupled to the first connector slot and the second connector slot;

an antenna jack connected to the cordless telephone device;

a radio frequency antenna electrically connected to the antenna jack; and a cordless telephone handset communicably coupled to the radio frequency antenna.

* * * * *